US008615060B2

(12) United States Patent
Yoshimochi et al.

(10) Patent No.: US 8,615,060 B2
(45) Date of Patent: Dec. 24, 2013

(54) RECEPTION APPARATUS, RECEPTION METHOD, AND PROGRAM

(75) Inventors: Naoki Yoshimochi, Kanagawa (JP);
Katsumi Takaoka, Chiba (JP);
Tetsuhiro Futami, Kanagawa (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/235,864

(22) Filed: Sep. 19, 2011

(65) Prior Publication Data

US 2012/0099635 A1   Apr. 26, 2012

(30) Foreign Application Priority Data

Oct. 22, 2010   (JP) ................................. 2010-237578

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC .......... 375/346; 375/343; 375/362; 375/365; 375/260; 37/208; 37/350; 37/509

(58) Field of Classification Search
USPC .......... 375/343, 362, 365, 260, 346; 370/208, 370/350, 509
See application file for complete search history.

(56) References Cited

U.S. PATENT DOCUMENTS

| 5,517,524 A * | 5/1996 | Sato ............................. 375/230 |
| 2004/0120307 A1 * | 6/2004 | Takahashi et al. ............ 370/350 |
| 2008/0049600 A1 * | 2/2008 | Liu ............................... 370/208 |
| 2009/0135931 A1 * | 5/2009 | Kawauchi et al. ............ 375/260 |
| 2011/0099453 A1 | 4/2011 | Yoshimochi et al. |

OTHER PUBLICATIONS

Gideon Kutz et al., "Determination of Tap Positions for Sparse Equalizers", IEEE Transactions on Communications., vol. 55, No. 9, Sep. 2007, pp. 1712-1724.
U.S. Appl. No. 13/235,917, filed Sep. 19, 2011, Ikegaya, et al.
U.S. Appl. No. 13/242,754, filed Sep. 23, 2011, Yoshimochi, et al.
U.S. Appl. No. 13/235,816, filed Sep. 19, 2011, Yoshimochi, et al.
U.S. Appl. No. 13/236,005, filed Sep. 19, 2011, Kawauchi, et al.

* cited by examiner

Primary Examiner — Phuong Phu
(74) Attorney, Agent, or Firm — Sony Corporation

(57) ABSTRACT

Disclosed herein is a reception apparatus including a calculation section and a storage section. The calculation section calculates correlation values between a data sequence included in a known signal and a received signal at a given point in time. The storage section has at least an area sufficient for storing the correlation values calculated for one frame using the received signal which is one frame long and to which the known signal is added.

14 Claims, 19 Drawing Sheets

FIG. 2

| PN | PN LENGTH | DATA LENGTH | FRAME LENGTH |
|---|---|---|---|
| PN420 | 420 | 3780 | 4200 |
| PN595 | 595 | 3780 | 4375 |
| PN945 | 945 | 3780 | 4725 |

(PRIOR ART)

RECEPTION APPARATUS, RECEPTION METHOD, AND PROGRAM

BACKGROUND

The present disclosure relates to a reception apparatus, a reception method, and a program. More particularly, the disclosure relates to a reception apparatus, a reception method, and a program for performing channel estimation accurately when the delay amount of echo is significant or when it is difficult to distinguish a dominant wave from echo.

There exists the DTMB (Digital Terrestrial Multimedia Broadcast) standard for terrestrial digital broadcasts. According to the DTMB standard, either a single carrier modulation system or a multi-carrier modulation system may be selected as the data modulation system.

In the description that follows, single carrier transmission will refer to the act of transmitting data by the single carrier modulation system, and multi-carrier transmission will signify the act of transmitting data by the multi-carrier modulation system.

Upon single carrier transmission under the DTMB standard, a PN signal and a data signal are sent periodically for data transmission. Upon multi-carrier transmission, an IFFT (Inverse Fast Fourier Transform) operation is performed on the PN signal and data signal, and the resulting data is transmitted periodically. The PN signal is a known signal that includes a predetermined data sequence. This signal is added to each frame as a guard interval against inter-frame interference.

FIG. 1 is a schematic view showing the frame format of the DTMB standard.

As shown in FIG. 1, each frame under the DTMB standard is made up of a single PN signal (PN) and a single data signal (DATA). The frame length is defined as the PN length plus the data length. The frame length is shown in FIG. 2. The PN length is given as the number of symbols (selectable from 420, 595, or 945 symbols). The data length is fixed to 3780 symbols (i.e., 3780 samples following the IFFT operation).

If the PN length is 420 symbols (in the case of PN420), the frame length is 4200 symbols; if the PN length is 595 symbols (PN595), the frame length is 4375 symbols; if the PN length is 945 symbols (PN945), the frame length is 4725 symbols.

A reception apparatus determines the PN length of the PN signal used in a received signal by reproducing a PN sequence (i.e., the same data sequence as that included in each PN signal of 420, 595, or 945 symbols) and by finding correlation values between the PN sequence and the received signal. The reception apparatus proceeds to receive a data signal subsequent to the PN signal and perform various processes such as equalization on the received data signal.

Incidentally, sparse equalization is one typical technique of equalization. This is a technique for making it possible to equalize long-delayed echo by inserting a variable delay buffer in the data line of a filter used by an equalizer so as to virtually prolong the tap length.

The reception apparatus that complies with the DTMB standard is furnished with two equalizers: one for receiving the data transmitted by single carrier transmission, and another for receiving data sent by multi-carrier transmission.

FIG. 3 is a block diagram showing a structure of a single carrier equalizer that equalizes the signal representative of the data transmitted by single carrier transmission.

Circuits located upstream of the single carrier equalizer frequency-convert the received signal into an IF signal and carry out such processes as analog to digital (A/D) conversion and orthogonal demodulation on the IF signal. The processes turn the IF signal into an input signal ID(t) signal composed of a PN signal and a data signal per frame. The input signal ID(t) is input to an FFE (Feed Forward Equalizer) 11, an LMS (Least Mean Square) operation portion 16, and a channel estimation portion 18. The single carrier equalizer equalizes time domain signals using the FFE 11 and an FBE (Feed Back Equalizer) 14.

The FFE 11 is composed of a variable coefficient filter that performs a convolution operation on the input signal ID(t) and on a coefficient C0(n), the coefficient being obtained by the LMS operation portion 16. The FFE 11 outputs to an addition portion 12 a signal OD0(t) representing the result of the convolution operation. The output signal OD0(t) of the FFE 11 is defined by the following expression (1):

$$OD0(t) = \sum_{i=0}^{N\_FFE-1} ID(t-i) \times C0(i) \quad (1)$$

where, N_FFE denotes the tap count of the FFE 11.

The addition portion 12 adds up the output signal OD0(t) of the FFE 11 and an output signal OD1(t) of the FBE 14 to generate an equalized signal OD(t) (OD(t)=OD0(t)+OD1(t)) that is output. The equalized signal OD(t) from the addition portion 12 is output outside the single carrier equalizer and supplied to a hard decision portion 13 and an error calculation portion 15.

The hard decision portion 13 performs a hard decision on the equalized signal OD(t) fed from the addition portion 12, and outputs a signal OD'(t) representing the result of the hard decision. The signal OD'(t) is sent to the FBE 14, error calculation portion 15, and an LMS operation portion 17.

The FBE 14 is also composed of a variable coefficient filter that performs a convolution operation on the signal OD'(t) fed from the hard decision portion 13 and on a coefficient C1(n), the coefficient being acquired by the LMS operation portion 17. The FBE 14 outputs the signal OD1(t) representing the result of the convolution operation. The output signal OD1(t) is sent to the addition portion 12 that uses the signal in the addition involving the output signal OD0(t). The output signal OD1(t) of the FBE 14 is defined by the following expression (2):

$$OD1(t) = \sum_{i=0}^{N\_FBE-1} OD'(t-\alpha-i) \times C1(i) \quad (2)$$

where, N_FBE represents the tap count of the FBE 14, and α denotes the delay involved until the signal OD'(t) is obtained from the equalized signal OD(t).

The data line of the FBE 14 is furnished with a variable delay buffer that supports sparse equalization where the delay amount of echo is significant. The channel estimation portion 18 establishes the delay amount "delay" of the variable delay buffer.

The error calculation portion 15 subtracts the signal OD'(t) representing the hard decision result fed from the hard decision portion 13, from the equalized signal OD(t) supplied from the addition portion 12 so as to obtain an error signal E(t) (E(t)=OD(t)−OD'(t)) that is output. The error signal E(t) from the error calculation portion 15 is sent to the LMS operation portions 16 and 17.

The LMS operation portion 16 performs an LMS operation on the input signal ID(t) and on the error signal E(t) fed from the error calculation portion 15 in order to update the coefficient C0(n) of the FFE 11.

The LMS operation portion 17 performs an LMS operation on the signal OD'(t) representing the hard decision result fed from the hard decision portion 13 and on the error signal E(t) supplied from the error calculation portion 15 in order to update the coefficient C1(n) of the FBE 14.

The channel estimation portion 18 estimates the channel based on the input signal ID(t) and determines the delay amount "delay." A signal representing the delay amount "delay" determined by the channel estimation portion 18 is sent to the FBE 14. For sparse equalization, it is important accurately to perform channel estimation in order to establish properly the delay amount of the variable delay buffer in the FBE 14.

FIG. 4 is a block diagram showing a structure of the channel estimation portion 18.

The channel estimation portion 18 is made up of a PN correlation calculation portion 31, a correlation peak detection portion 32, a write control portion 33, and a correlation value storage memory 34. The input signal ID(t) is input to the PN correlation calculation portion 31.

The PN correlation calculation portion 31 reproduces the PN sequence and calculates correlation values between the reproduced PN sequence and the input signal ID(t). The correlation values corr(t) obtained by the PN correlation calculation portion 31 are fed to the correlation peak detection portion 32 and correlation value storage memory 34.

The correlation peak detection portion 32 detects a peak of the correlation values corr(t) fed from the PN correlation calculation portion 31, and outputs to the write control portion 33 a peak position flag "pe" representing the peak position.

The correlation value storage memory 34 has three areas formed therein: an area allocated for the dominant wave, an area for pre-echo, and an area for post-echo. The write control portion 33 outputs a write flag "we" so as to write to each of the areas the correlation values corr(t) obtained using the input signals ID(t) before and after a dominant wave position designated by the peak position flag "pe."

The write control portion 33 outputs the write flag "we" so as to write the correlation values corr(t) corresponding to a time "t" defined as $$tp-X \leq t \leq tp+Y$$

where, X stands for the size of the pre-echo area, Y for the post-echo area, and "tp" for the time at which a peak position is detected. For example, the fact that the size of the pre-echo area is X indicates that this area can store the correlation values corr(t) obtained using an input signal ID(t) corresponding to the X time.

A delay profile determination portion 35 outputs a read flag "re" so as to read the correlation values corr(t) from the correlation value storage memory 34 and detect the echo position for channel estimation. With the channel estimated, the delay profile determination portion 35 determines the delay amount "delay" accordingly and outputs a signal representing the delay amount "delay" to the FBE 14.

According to the DTMB standard, as explained above, the PN signal is inserted in the start of each frame as a guard interval. Thus correlation values are calculated between the PN sequences and the received signals (input signals ID(t)), and an estimated channel value is obtained from the correlation values.

In connection with the current disclosure, reference may be made to "Determination of Tap Positions for Sparse Equalizers" by Kutz, G., Raphaeli, D.; Communications, IEEE Transactions on, Vol. 55, No. 9, 2007 (Non-patent Document 1).

SUMMARY

In order to deal with long-delayed echo in sparse equalization, it is generally necessary to allocate in the correlation value storage memory a pre-echo area and a post-echo area in which to store correlation values calculated between the PN sequences and the received signals over a sufficiently long interval.

If echo is found in a position exceeding the estimated delay amount, the correlation values may not be stored into the correlation value storage memory. This may result in faulty channel estimation and prevent data from being received correctly. Also, if the dominant wave is not correctly distinguished from echo, the correlation values may be stored in the wrong area. Channel estimation may then be corrupted and data may not be received correctly.

The present disclosure has been made in view of the above circumstances and provides a reception apparatus, a reception method, and a program for performing channel estimation accurately when the delay amount of echo is significant or when it is difficult to distinguish the dominant wave from echo.

According to one embodiment of the present disclosure, there is provided a reception apparatus including: a calculation section configured to calculate correlation values between a data sequence included in a known signal and a received signal at a given point in time; and a storage section configured to have at least an area sufficient for storing the correlation values calculated for one frame using the received signal which is one frame long and to which the known signal is added.

Preferably, the reception apparatus of the present disclosure may further include an estimation section configured to perform channel estimation based on the correlation values stored in the storage section for one frame.

Preferably, the estimation section may estimate the positions of a dominant wave and of echo based on the magnitude of the absolute values of the correlation values and on a peak-to-peak distance of the correlation values.

Preferably, the reception apparatus of the present disclosure may further include an equalization section configured to equalize the received signal by multiplying the received signal at each point in time by a coefficient assigned to the received signal at that point in time and by adding up the results of the multiplications. The estimation section may establish a delay amount of a variable delay buffer in accordance with the result of the channel estimation so as to let the coefficient be assigned to the received signal that turns out to be echo. The equalization section may cause the variable delay buffer to delay the received signal at each point in time so as to perform the equalization.

Preferably, the storage section and the variable delay buffer may be implemented by the same storage section.

Preferably, the received signal may be a data signal transmitted by single carrier transmission under the DTMB standard. The reception apparatus of the present disclosure may further include a reception section configured such that upon receipt of data transmitted by multi-carrier transmission under the DTMB standard, the reception section may perform operations using the same storage section implementing both the storage section and the variable delay buffer in order to receive the data transmitted by the multi-carrier transmission.

According to another embodiment of the present disclosure, there is provided a reception method including: calculating correlation values between a data sequence included in a known signal and a received signal at a given point in time; and storing the correlation values calculated for one frame using the received signal which is one frame long and to which the known signal is added, into a storage section having at least an area sufficient for storing the correlation values.

According to a further embodiment of the present disclosure, there is provided a program for causing a computer to execute a process including: calculating correlation values between a data sequence included in a known signal and a received signal at a given point in time; and storing the correlation values calculated for one frame using the received signal which is one frame long and to which the known signal is added, into a storage section having at least an area sufficient for storing the correlation values.

When the present disclosure is embodied as outlined above, correlation values are calculated between a data sequence included in a known signal and a received signal at a given point in time. The correlation values calculated for one frame using the received signal which is one frame long and to which the known signal is added are then stored into a storage section having at least an area sufficient for storing the correlation values.

According to the present disclosure outlined above, it is possible to perform channel estimation accurately when the delay amount of echo is significant or when it is difficult to distinguish the dominant wave from echo.

BRIEF DESCRIPTION OF THE DRAWINGS

FIG. 2 is a tabular view listing frame lengths;

DETAILED DESCRIPTION OF THE PREFERRED EMBODIMENTS

[Typical Structure of Reception Apparatus]

Figure 5:
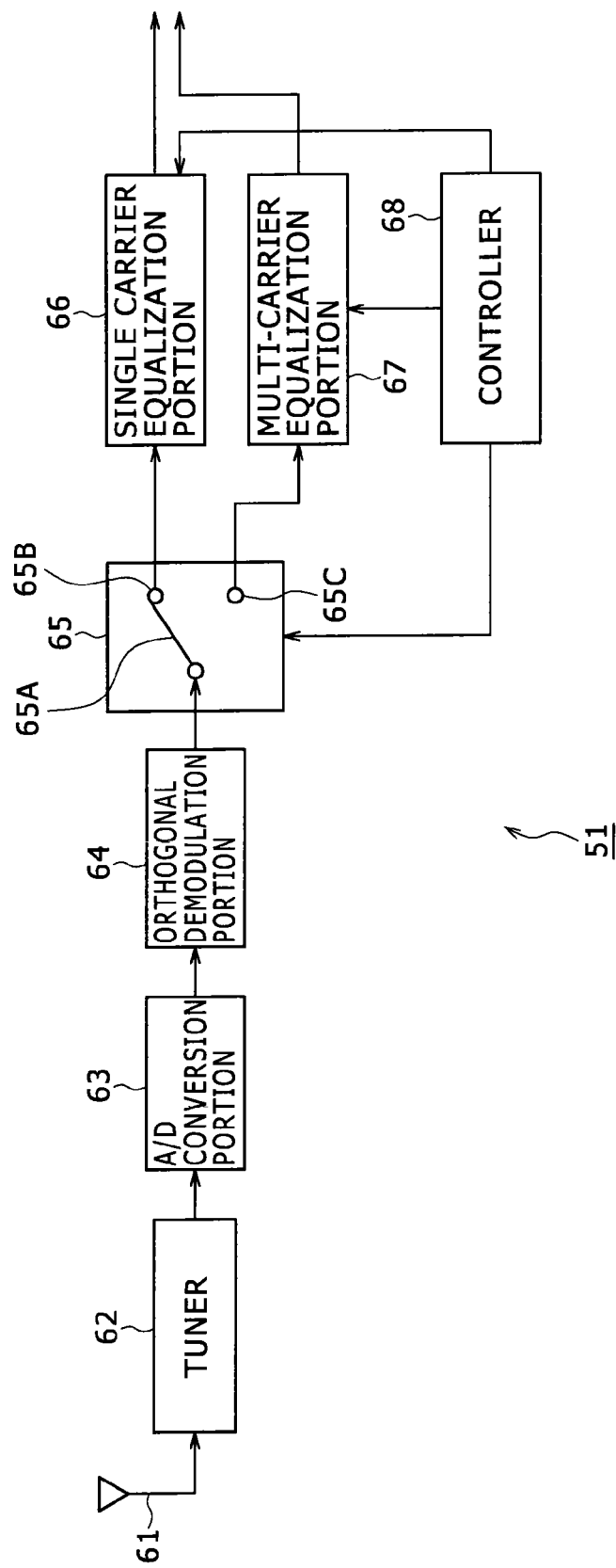
FIG. 5 is a block diagram showing a typical structure of a reception apparatus embodying the present disclosure.

FIG. 5 is a block diagram showing a typical structure of a reception apparatus 51 embodying the present disclosure.

The reception apparatus 51 is made up of an antenna 61, a tuner 62, an A/D conversion portion 63, an orthogonal demodulation portion 64, a switching portion 65, a single carrier equalization portion 66, a multi-carrier equalization portion 67, and a controller 68. For example, the reception apparatus 51 may be a receiver that complies with the DTMB standard for terrestrial digital broadcasts.

Under the DTMB standard, as explained above, either the single carrier modulation system or the multi-carrier modulation system may be selected as the data modulation system. The reception apparatus 51 complying with the DTMB standard has the capability of receiving data transmitted by the single carrier modulation system and the capability of receiving data sent by the multi-carrier modulation system.

The tuner 62 receives an RF signal, frequency-converts the received RF signal into an IF signal, and outputs the IF signal to the A/D conversion portion 63.

The A/D conversion portion 63 performs A/D conversion on the signal fed from the tuner 62, and outputs the data derived from the conversion.

The orthogonal demodulation portion 63 performs orthogonal demodulation on the data fed from the A/D conversion portion 63, and outputs a baseband signal. The orthogonal demodulation portion 64 outputs either a time domain signal representing data transmitted by single carrier transmission or a time domain signal representative of data sent by multi-carrier transmission.

Under control of the controller 68, the switching portion 65 switches the destinations to which to output the signal supplied from the orthogonal demodulation portion 64. Upon receipt of data transmitted by single carrier transmission, the switching portion 65 connects a switch 65A to a terminal 65B to let the signal sent from the orthogonal demodulation portion 64 be output to the single carrier equalization portion 66. On receiving data sent by multi-carrier transmission, the switching portion 65 connects the switch 65A to a terminal 65C to let the signal fed from the orthogonal demodulation portion 64 be output to the multi-carrier equalization portion 67.

Under control of the controller 68, the signal carrier equalization portion 66 equalizes the signal fed from the switching portion 65 and outputs the equalized signal.

The multi-carrier equalization portion 67 under control of the controller 68 equalizes the signal supplied from the switching portion 65 and outputs the equalized signal.

Downstream circuits then perform such processes as error correction on the data represented by the equalized signal output from the single carrier equalization portion 66 or from the multi-carrier equalization portion 67.

[Structure of Single Carrier Equalization Portion 66]

Figure 6:
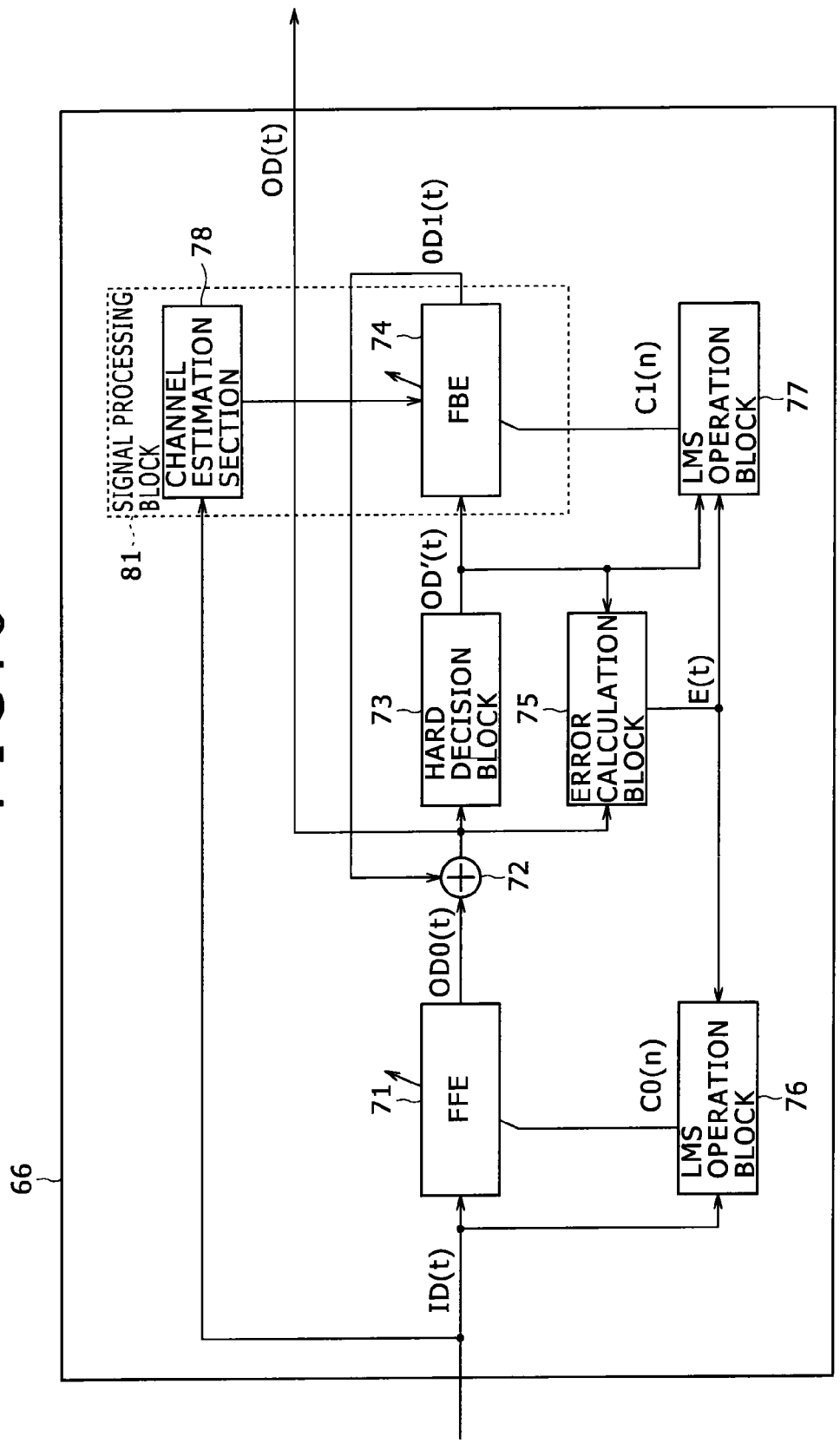
FIG. 6 is a block diagram showing a typical structure of a single carrier equalization portion included in FIG. 5.

FIG. 6 is a block diagram showing a typical structure of the single carrier equalization portion 66.

Figure 1:
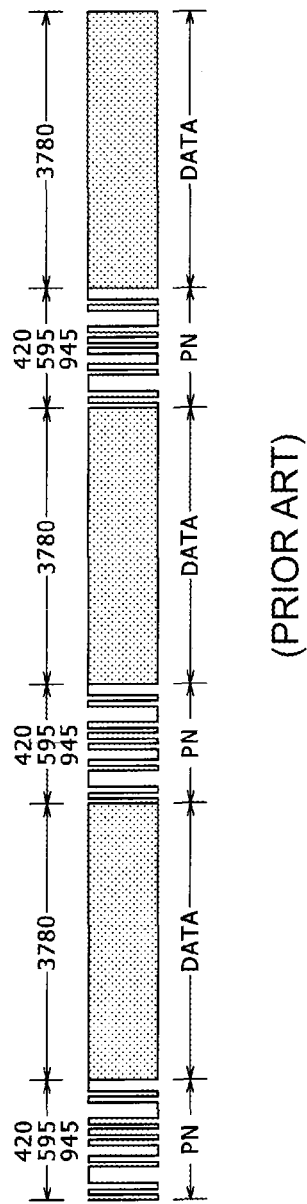
FIG. 1 is a schematic view showing the frame format of the DTMB standard.
Figure 3:
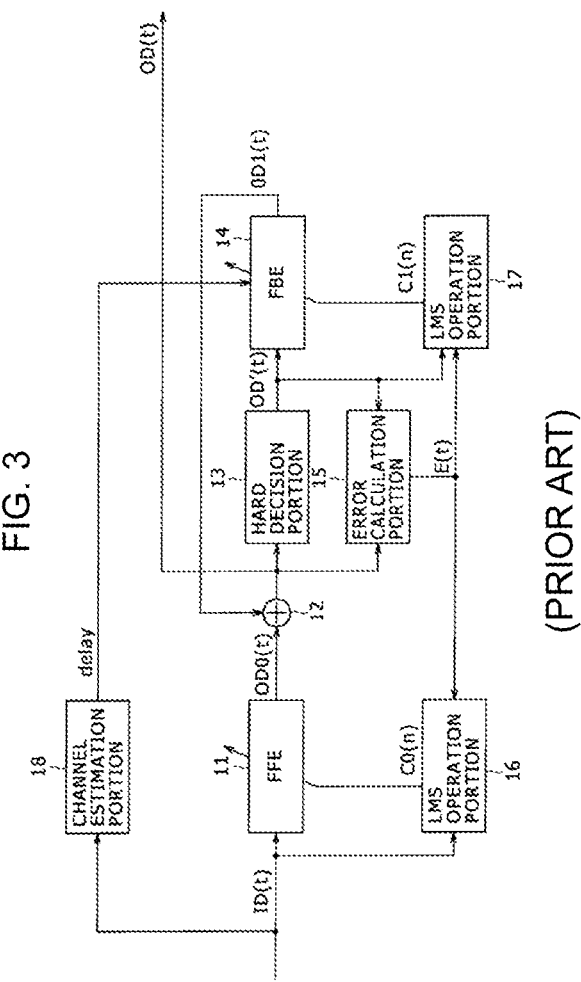
FIG. 3 is a block diagram showing a structure of an ordinary single carrier equalizer.
Figure 4:
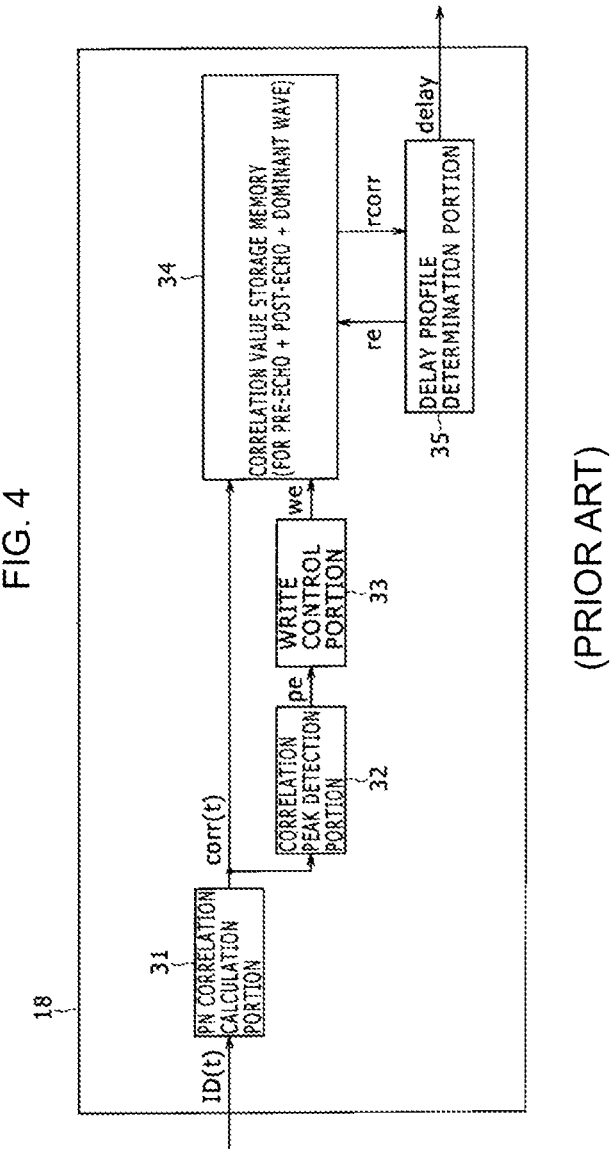
FIG. 4 is a block diagram showing a structure of a channel estimation portion included in FIG. 3.

The structure of the single carrier equalization portion 66 is basically the same as that of the ordinary single carrier equalizer explained above in reference to FIG. 1. In the single carrier equalization portion 66, a signal made up of a PN signal and a data signal per frame and fed from the switching portion 65 is input to an FFE 71, an LMS operation block 76, and a channel estimation section 78 as an input signal ID(t).

The FFE 71 is composed of a variable coefficient filter. Given a coefficient C0(n) obtained by the LMS operation block 76, the FFE 71 performs a convolution operation on the input signal ID(t) and on the coefficient C0(n) and outputs a signal OD0(t) representing the result of the convolution operation to an addition block 72. If the tap count of the FFE 71 is assumed to be represented by N_FFE, the output signal OD0(t) of the FFE 71 is defined by the expression (1) described above.

The addition block 72 adds up the output signal OD0(t) of the FFE 71 and an output signal OD1(t) of an FBE 74 to generate an equalized signal OD(t) (OD(t)=OD0(t)+OD1(t)) that is output. The equalized signal OD(t) from the addition block 72 is output outside of the single carrier equalization portion 66 and supplied to a hard decision block 73 and an error calculation block 75.

The hard decision block 73 performs a hard decision on the equalized signal OD(t) fed from the addition block 72 and outputs a signal OD'(t) representing the result of the hard decision. The signal OD'(t) is sent to the FBE 74, to the error calculation block 75, and to an LMS operation block 77.

The FBE 74 is also composed of a variable coefficient filter. Given a coefficient C1(n) obtained by the LMS operation block 77, the FBE 74 performs a convolution operation on the signal OD'(t) fed from the hard decision block 73 and on the coefficient C1(n) and outputs a signal OD1(t) representing the result of the convolution operation. The output signal OD1(t) is sent to the addition block 72 that uses the signal in the addition involving the output signal OD0(t). If the tap count of the FBE 74 is assumed to be represented by N_FBE, then the output signal OD1(t) of the FBE 74 is defined by the expression (2) explained above.

A variable delay buffer is provided in the data line of the FBE 74. The channel estimation section 78 acquires the delay amount "delay" of the variable delay buffer. The FBE 74 and the channel estimation section 78 make up a signal processing block 81.

The error calculation block 75 subtracts the signal OD'(t) representing the hard decision result fed from the hard decision block 73, from the equalized signal OD(t) supplied from the addition block 72 so as to obtain an error signal E(t) (E(t)=OD(t)−OD'(t)) that is output. The error signal E(t) from the error calculation block 75 is sent to the LMS operation portions 76 and 77.

The LMS operation block 76 performs an LMS operation on the input signal ID(t) and on the error signal E(t) fed from the error calculation block 75 in order to update the coefficient C0(n) of the FFE 71.

The LMS operation block 77 performs an LMS operation on the signal OD'(t) representing the hard decision result fed from the hard decision block 73 and on the error signal E(t) supplied from the error calculation block 75 in order to update the coefficient C1(n) of the FBE 74.

The channel estimation section 78 estimates the channel based on the input signal ID(t) and determines the delay amount "delay." The channel estimation section 78 proceeds to output a signal representing the delay amount "delay" to the FBE 74.

The channel estimation section 78 calculates correlation values between the input signal ID(t) and the PN sequence and performs channel estimation based on the correlation values. The memory for accommodating correlation values is arranged to have a capacity large enough to store the correlation values between the input signal ID(t) and PN sequence for one frame. Channel estimation is thus performed based on the correlation values between the input signal ID(t) and PN sequence for one frame stored in the correlation value storage memory.

[First Example of Channel Estimation Portion]

Figure 7:
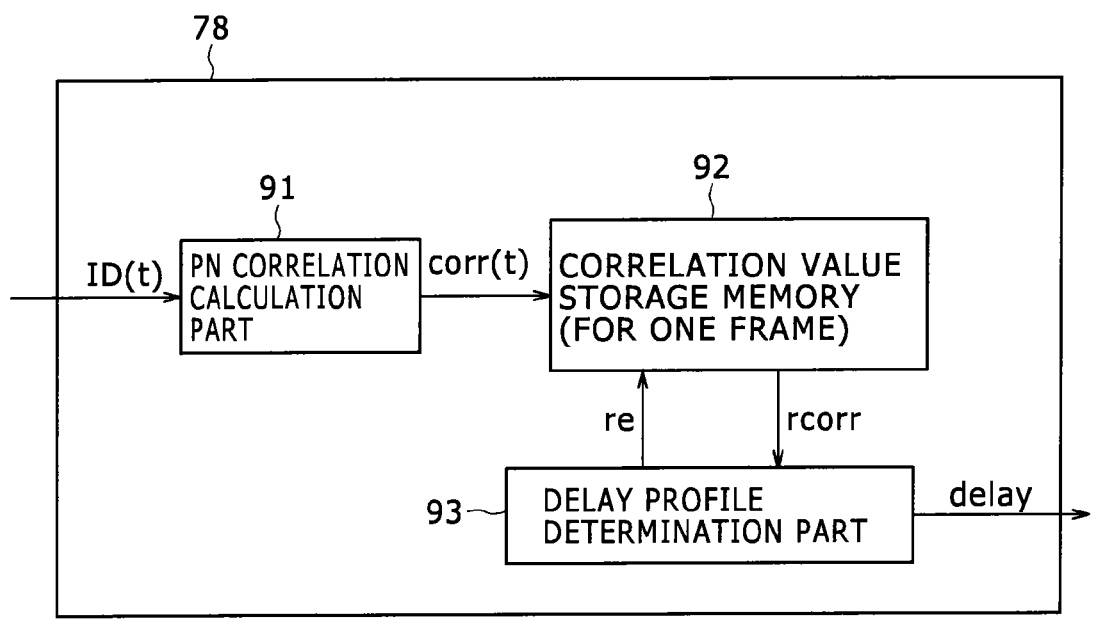
FIG. 7 is a block diagram showing a first structure example of the channel estimation section.

FIG. 7 is a block diagram showing a first structure example of the channel estimation section 78.

The channel estimation section 78 is made up of a PN correlation calculation part 91, a correlation value storage memory 92, and a delay profile determination part 93. The input signal ID(t) is input to the PN correlation calculation part 91.

The PN correlation calculation part 91 reproduces a PN sequence constituting the same data sequence as that included in the PN signal, and calculates correlation values between the reproduced PN sequence and the input signal ID(t). The PN correlation calculation part 91 proceeds to output the correlation values corr(t) obtained using the input signal ID(t) at each point in time to the correlation value storage memory 92 for storage therein.

The correlation value storage memory 92 has at least a capacity large enough to store the correlation values between the input signal ID(t) and PN sequence for one frame length. The correlation value storage memory 92 stores the correlation values corr(t) for one frame supplied from the PN correlation calculation part 91.

The delay profile determination part 93 outputs a read flag "re" so as to read the correlation values corr(t) (signal "rcorr") stored in the correlation value storage memory 92. Based on the one-frame correlation values corr(t)) thus retrieved, the delay profile determination part 93 detects echo positions and estimates the channel. The delay profile determination part 93 proceeds to determine the delay amount "delay" in accordance with the estimated channel and output a signal representing the delay amount "delay" to the FBE 74.

Figure 8:
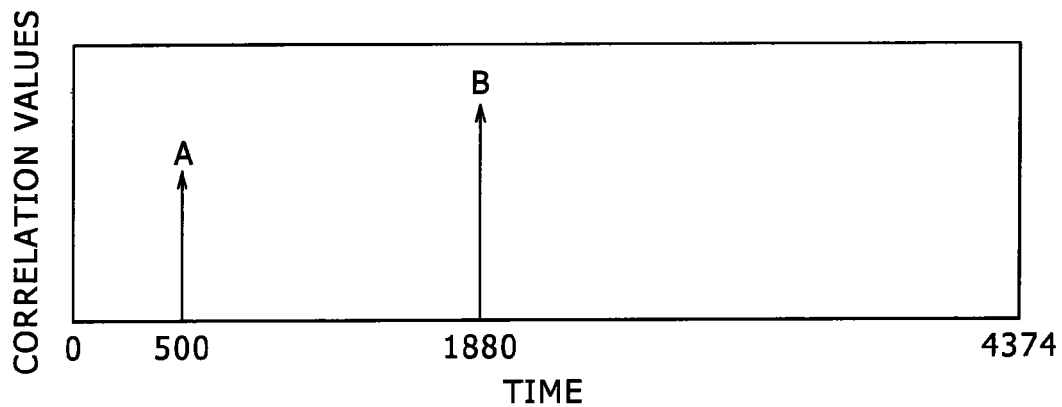
FIG. 8 is a schematic view showing typical correlation values for one frame in the case of PN595.

FIG. 8 is a schematic view showing typical correlation values for one frame in the case of PN595.

In FIG. 8, the horizontal axis denotes time (symbols) and the vertical axis represents the absolute values of correlation values corr(t). If the correlation values corr(t) are assumed to be calculated using the input signal ID(t) given at each point in time, then as many correlation values corr(t) as the number representing the frame length (4375 in the case of PN595) are stored into the correlation value storage memory 92. In the example of FIG. 8, a correlation value corr(500) is obtained at the 500th symbol, and a correlation value corr(1880) larger than the correlation value corr(500) is acquired at the 1880th symbol.

Based on the above-described correlation values corr(t) for one frame, the delay profile determination part 93 detects the magnitude of the absolute values of the correlation values corr(t) and a peak-to-peak distance of the correlation values corr(t). Also, the delay profile determination part 93 estimates the positions of a dominant wave and of echo and determines the delay amount "delay" based on the magnitude of the absolute values of the correlation values corr(t) and on the peak-to-peak distance thereof.

When the results such as those in FIG. 8 are obtained, the delay profile determination part 93 may typically determine as the dominant wave a path B of which the absolute value of the correlation value corr(t) detected at the 1880th symbol is the largest. The delay profile determination part 93 may then determine a path A detected at the 500th symbol as a post-echo of which the delay amount is 2995 symbols (4374−1880+501 symbols). The delay profile determination part 93 determines the delay amount "delay" in such a manner that a filter coefficient is assigned by the FBE 74 to the path A (i.e., for multiplication thereof by the filter coefficient) determined as the post-echo.

Because all correlation values for one frame are stored, even if the path A is a pre-echo that precedes by 1380 symbols the path B as the dominant wave, it is possible to handle the path A as a post-echo having a delay amount of 2995 symbols.

Figure 9:
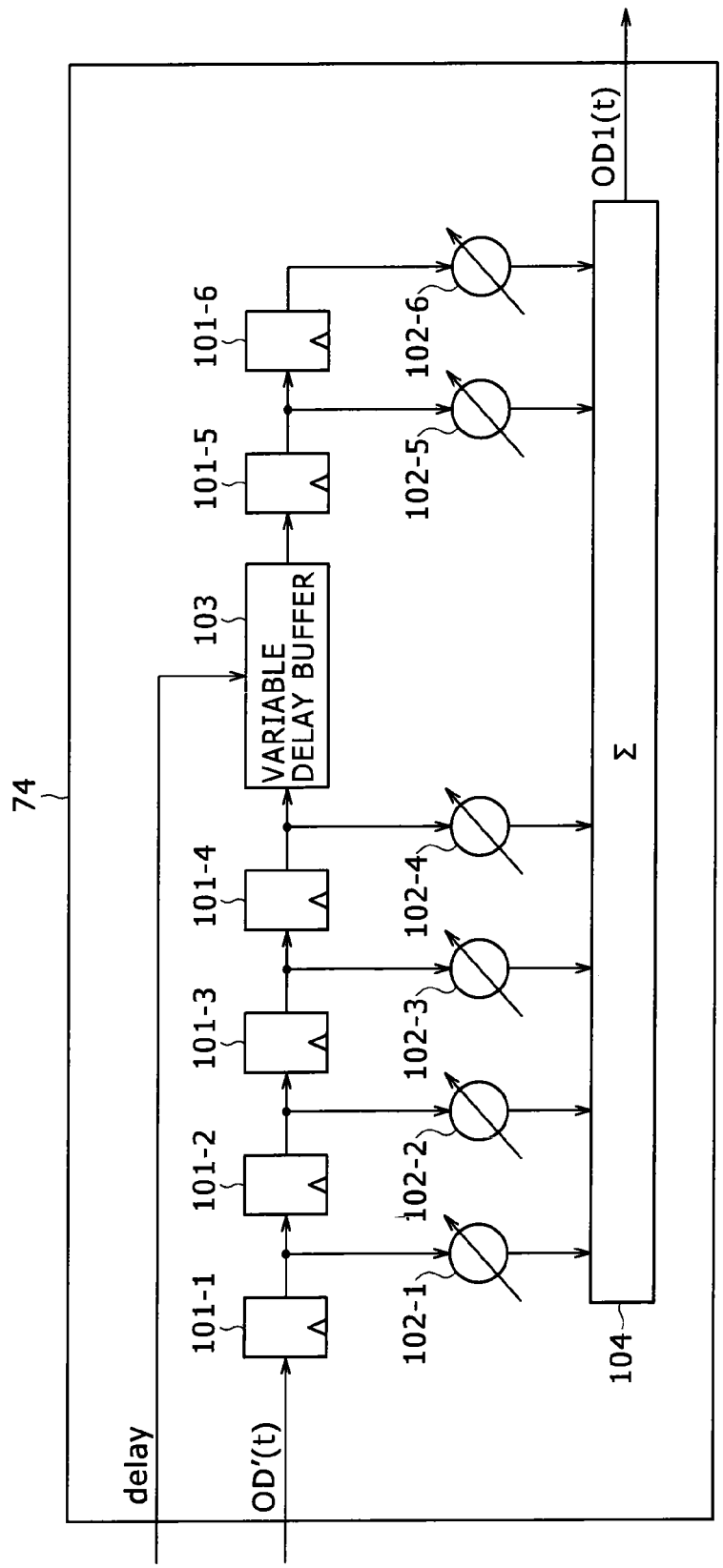
FIG. 9 is a block diagram showing a typical structure of an FBE.

FIG. 9 is a block diagram showing a typical structure of the FBE 74.

The FBE 74 shown in FIG. 9 is a transversal filter having a tap count of six. The FBE 74 is made up of flip-flops 101-1 through 101-6, multipliers 102-1 through 102-6, a variable delay buffer 103, and an adder 104. The variable delay buffer 103 is furnished on the data line and interposed between the flip-flop 101-4 and the flip-flop 101-5.

The signal OD'(t) representing the hard decision result output from the hard decision block 73 is input to the flip-flop 101-1, and the signal representing the delay amount "delay" output from the channel estimation section 78 is input to the variable delay buffer 103. The coefficient C1(n) obtained by the LMS operation block 77 is assigned to each of the multipliers 102-1 through 102-6.

The flip-flops 101-1 through 101-6 hold the input data respectively and output the retained data in a suitably timed manner.

The multipliers 102-1 through 102-6 multiply the outputs from the flip-flops 101-1 through 101-6 by the coefficient C1(n) established by the LMS operation block 77, and output the results of the multiplications to the adder 104.

The variable delay buffer 103 delays the output of the flip-flop 101-4 in accordance with the delay amount "delay" obtained by the channel estimation section 78, and outputs the delayed result to the flip-flop 101-5. The delay amount "delay" is not smaller than zero and not exceeding the period of delay available from the buffer size of the variable delay buffer 103.

The adder 104 adds up the multiplication results fed from the multipliers 102-1 through 102-6, and outputs the sum as the output signal OD1(t) to the addition block 72.

[Example of Equalization Process]

Figure 10:
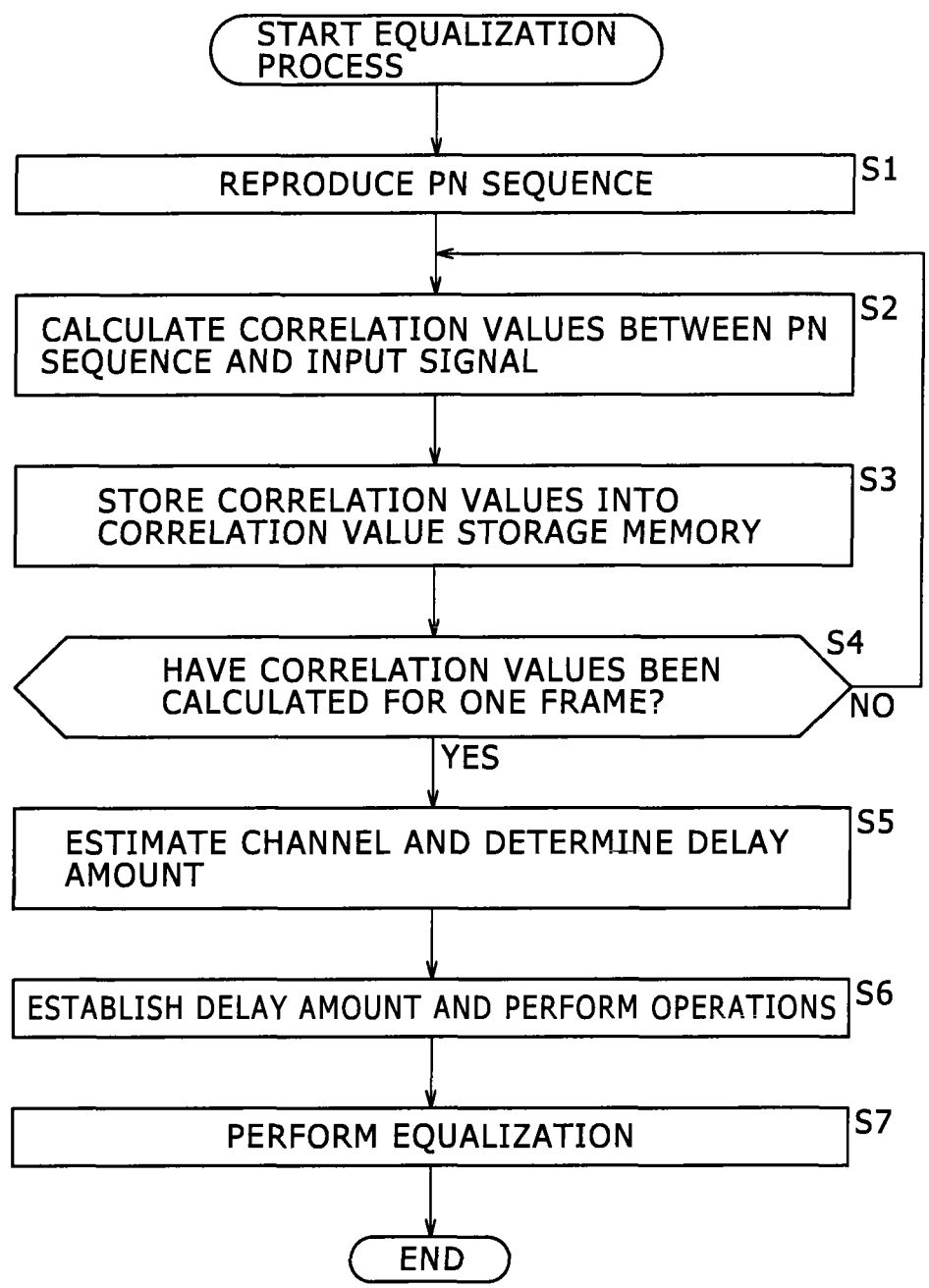
FIG. 10 is a flowchart explanatory of the flow of an equalization process.

Explained below in reference to the flowchart of FIG. 10 is a typical flow of the equalization process performed by the channel estimation section 78 in FIG. 7 and by the FBE 74 in FIG. 9. The process in FIG. 10 is started when the input signal ID(t) is input to the channel estimation section 78.

In step S1, the PN correlation calculation part 91 of the channel estimation section 78 reproduces a PN sequence.

In step S2, the PN correlation calculation part 91 calculates correlation values between the reproduced PN sequence and the input signal ID(t).

In step S3, the PN correlation calculation part 91 outputs the calculated correlation values corr(t) to the correlation value storage memory 92 for storage therein.

In step S4, the PN correlation calculation part 91 determines whether the correlation values corr(t) for one frame have been calculated. If it is determined in step S4 that the correlation values corr(t) for one frame have yet to be calculated, the PN correlation calculation part 91 returns to step S2 and repeats calculation of the correlation values corr(t).

If it is determined in step S4 that the correlation values corr(t) for one frame have been calculated, then step S5 is reached. In step S5, the delay profile determination part 93 reads the correlation values corr(t) for one frame stored in the correlation value storage memory 92. Based on the retrieved correlation values corr(t) for one frame, the delay profile determination part 93 estimates the channel and determines the delay amount "delay" in accordance with the estimated channel.

In step S6, the FBE 74 establishes the delay amount of the variable delay buffer 103 in accordance with the delay amount "delay" determined by the delay profile determination part 93, and performs operations using the coefficient C1(n) obtained by the LMS operation block 77. The signal OD1(t) representing the result of the convolution operation is output from the FBE 74 and sent to the addition block 72.

In step S7, the addition block 72 adds up the output signal OD0(t) from the FFE 71 and the output signal OD1(t) from the FBE 74 to generate the equalized signal OD(t) that is output. Thereafter, the equalization process is brought to an end.

As explained above, the channel estimation section 78 performs channel estimation using the correlation values for one frame. Since the correlation values for one frame include all profile information, channel estimation can be performed correctly provided echo interpretation is suitably carried out. Because all correlation values obtained through the calculations need only be stored in the correlation value storage memory 92, it is not necessary to become aware of such storage areas as the pre-echo area and post-echo area as the destination to which to write the correlation values.

[Second Example of Channel Estimation Portion]

Figure 11:
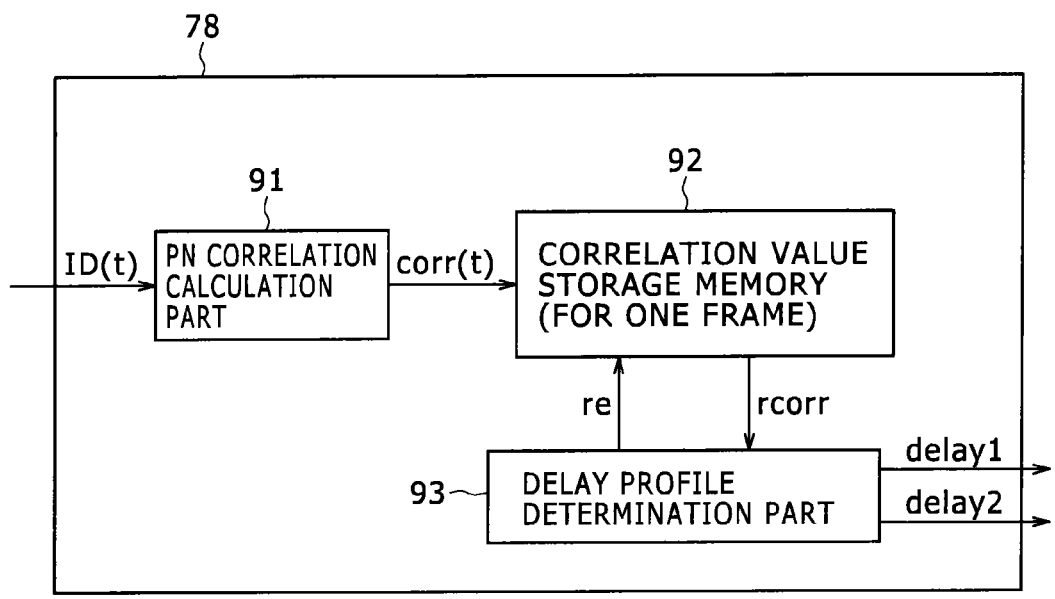
FIG. 11 is a block diagram showing a second structure example of the channel estimation section.

FIG. 11 is a block diagram showing a second structure example of the channel estimation section 78. Of the components shown in FIG. 11, those corresponding to like components in FIG. 7 are designated by like reference characters and their descriptions may be omitted hereunder where redundant.

The FBE 74 of which the amounts of delays by variable delay buffers are controlled by the channel estimation section 78 in FIG. 11 is provided with two variable delay buffers. The channel estimation section 78 determines the delay amounts of the two variable delay buffers furnished in the FBE 74.

The PN correlation calculation part 91 reproduces a PN sequence and calculates the correlations between the reproduced PN sequence and the input signal ID(t). The PN correlation calculation part 91 outputs the calculated correlation values corr(t) to the correlation value storage memory 92 for storage therein.

The correlation value storage memory 92 stores the correlation values corr(t) for one frame fed from the PN correlation calculation part 91.

The delay profile determination part 93 performs channel estimation based on the correlation values corr(t) for one frame stored in the correlation value storage memory 92. The delay profile determination part 93 determines delay amounts "delay1" and "delay2" in accordance with the estimated channel and outputs signals representing the two delay amounts to the FBE 74.

Figure 12:
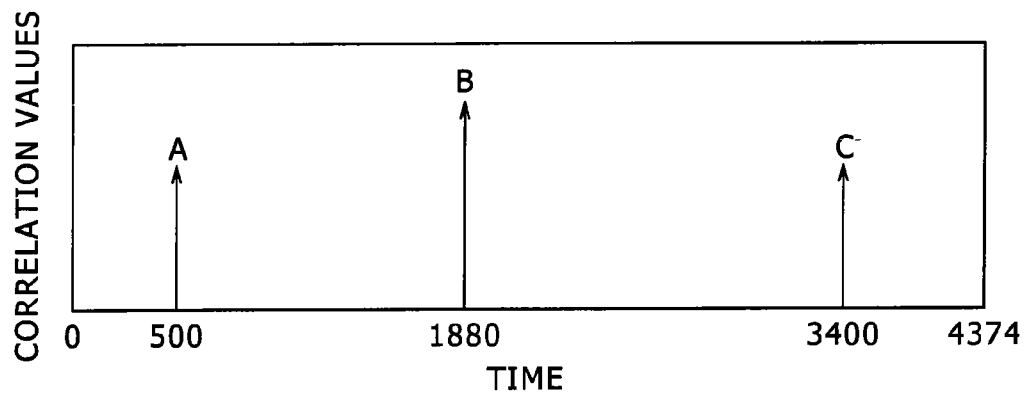
FIG. 12 is a schematic view showing other typical correlation values for one frame in the case of PN595.

FIG. 12 is a schematic view showing other typical correlation values for one frame in the case of PN595.

In the example of FIG. 12, a correlation value corr(500) is obtained at the 500th symbol; a correlation value corr(1880) larger than the correlation value corr(500) is acquired at the 1880th symbol; and a correlation value corr(3400) smaller than the correlation value corr(1880) is gained at the 3400th symbol.

For example, the delay profile determination part 93 may determine as the dominant wave a path B of which the absolute value of the correlation value corr(t) detected at the 1880th symbol is the largest. The delay profile determination part 93 may also determine a path C detected at the 3400th symbol as a post-echo having a delay amount of 1520 symbols, and a path A detected at the 500th symbol as another post-echo having a delay amount of 2995 symbols.

The delay profile determination part 93 determines the delay amounts "delay1" and "delay2" in such a manner that filter coefficients are assigned by the FBE 74 to the paths A and C determined as the post-echoes.

Figure 13:
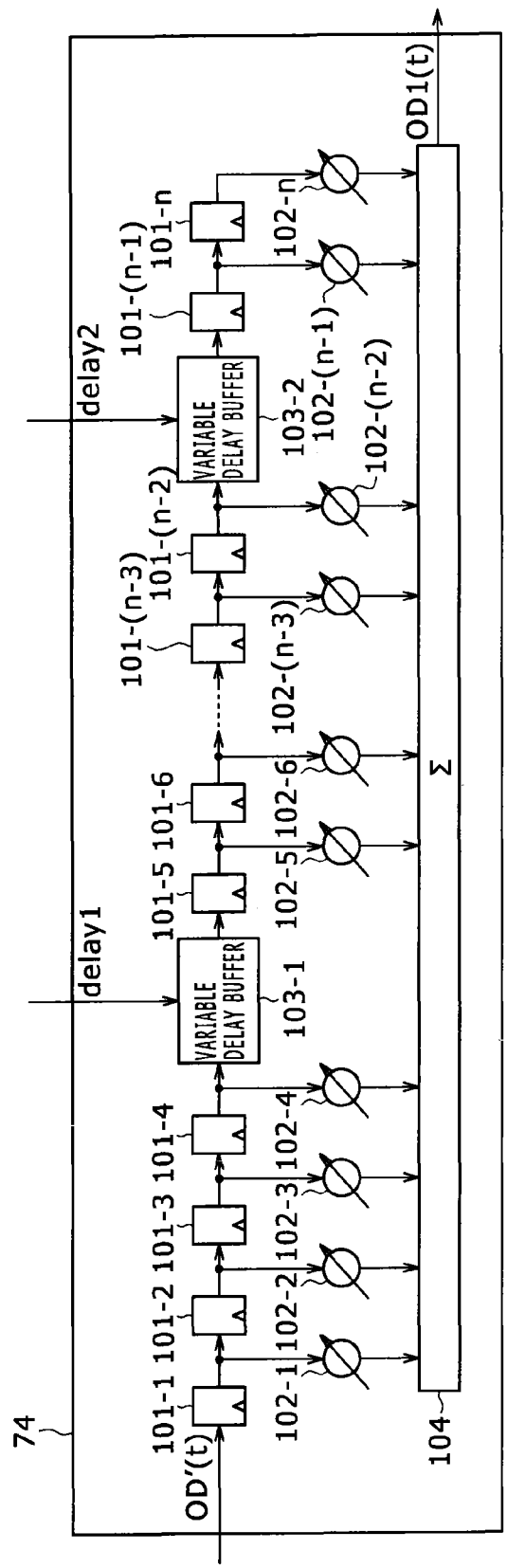
FIG. 13 is a block diagram showing another typical structure of the FBE.

FIG. 13 is a block diagram showing a typical structure of the FBE 74 of which the amounts of delays by variable delay buffers are controlled by the channel estimation section 78 having the structure illustrated in FIG. 11.

The FBE 74 in FIG. 13 is made up of flip-flops 101-1 through 101-n, multipliers 102-1 through 102-n, variable delay buffers 103-1 and 103-2, and an adder 104. The variable delay buffer 103-1 is provided on the data line and interposed between the flip-flops 101-4 and 101-5. The variable delay buffer 103-2 is interposed between the flip-flops 101-(n−2) and 101-(n−1).

The hard decision block 73 outputs a signal OD'(t) which represents the result of a hard decision and which is input to the flip-flop 101-1. The channel estimation section 78 outputs a signal that represents the delay amount "delay1" and is input to the variable delay buffer 103-1, and a signal that represents the delay amount "delay2" and is input to the variable delay buffer 103-2. The coefficient C1(n) obtained by the LMS operation block 77 is set to each of the multipliers 102-1 through 102-n.

The flip-flops 101-1 through 101-n hold the data input thereto and output the retained data in a suitably timed manner.

The multipliers 102-1 through 102-n multiply the outputs of the flip-flops 101-1 through 101-n respectively by the coefficient C1(n) established by the LMS operation block 77, and output the results of the multiplications to the adder 104.

The variable delay buffer 103-1 delays the output of the flip-flop 101-4 by the delay amount "delay1" obtained by the channel estimation section 78, and outputs the delayed result to the flip-flop 101-5.

The variable delay buffer 103-2 delays the output of the flip-flop 101-(n−2) by the delay amount "delay2" acquired by the channel estimation section 78, and outputs the delayed result to the flip-flop 101-(n−1).

The adder 104 adds up the results of the multiplications fed from the multipliers 102-1 through 102-n, and outputs the sum to the addition block 72 as the output signal OD1(t).

As described above, a plurality of variable delay buffers may be furnished on the data line (i.e., on a flip-flop array) of the FBE 74. The process performed by the channel estimation section 78 having the structure shown in FIG. 11 and by the FBE 74 with the structure of FIG. 13 is basically the same as the process explained above in reference to FIG. 10, except that the two delay amounts "delay1" and "delay2" are obtained.

[Example of Signal Processing Portion]

It is possible to implement the variable delay buffer of the FBE 74 and the correlation value storage memory of the channel estimation section 78 using the same shared memory.

Figure 14:
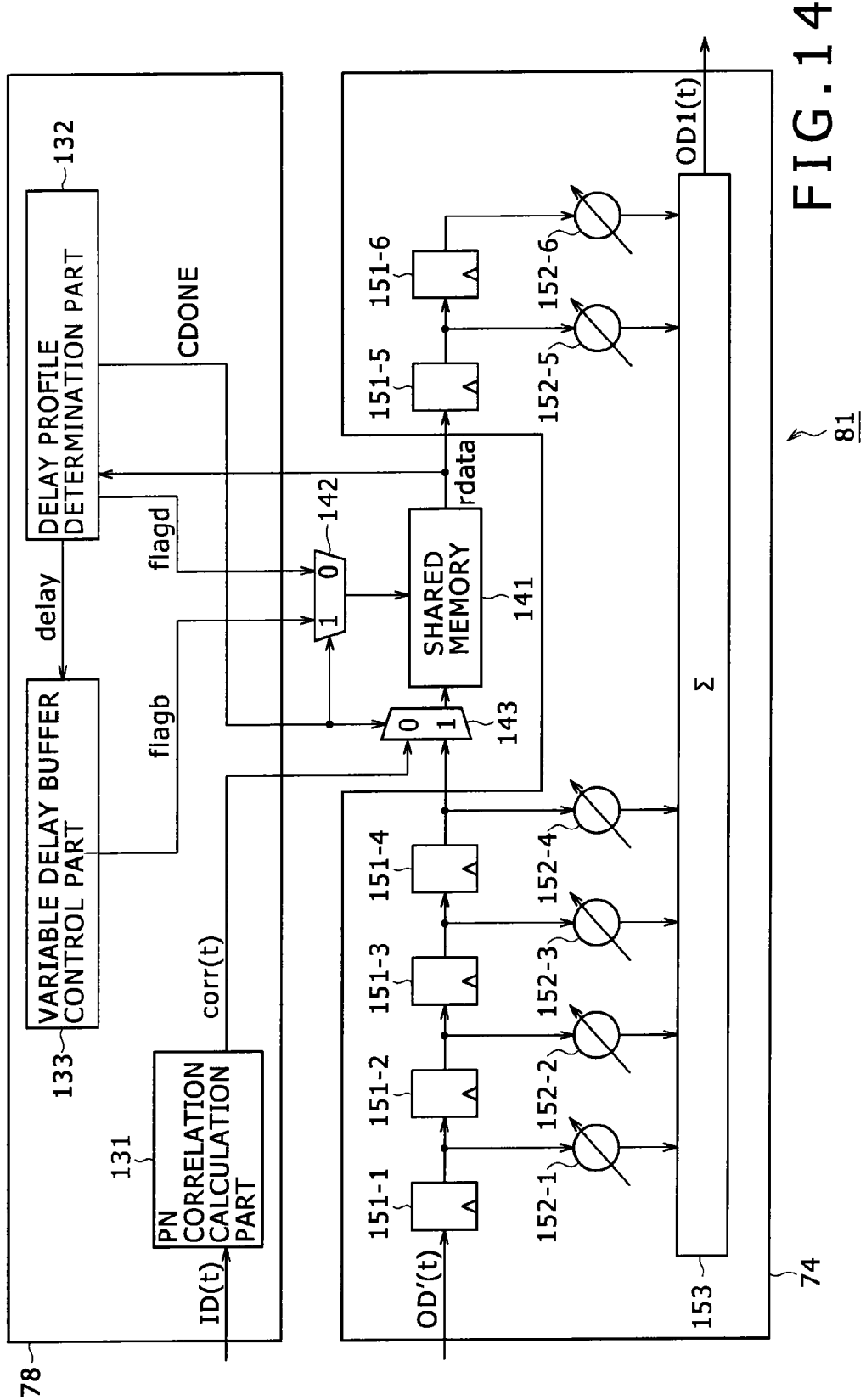
FIG. 14 is a block diagram showing a typical structure of a signal processing block.

FIG. 14 is a block diagram showing a typical structure of the signal processing block 81 that includes the FBE 74 and channel estimation section 78. In the signal processing block 81 of FIG. 14, a single shared memory 141 is used to implement both a buffer for delaying data in the equalization process performed by the FBE 74 and a memory for storing correlation values during channel estimation carried out by the channel estimation section 78.

The channel estimation section 78 is made up of a PN correlation calculation part 131, a delay profile determination part 132, and a variable delay buffer control part 133. An input signal ID(t) is input to the PN correlation calculation part 131.

The PN correlation calculation part 131 reproduces a PN sequence and calculates the correlation values between the reproduced PN sequence and the input signal ID(t). The correlation values corr(t) obtained by the PN correlation calculation portion 131 are supplied to a selector 143.

The delay profile determination part 132 outputs a correlation calculation complete flag CDONE to a selector 142 as well as to the selector 143, whereby the uses of the shared memory 141 are switched. For example, if the shared memory 141 is to be used for storing correlation values, then the delay profile determination part 132 sets the correlation calculation complete flag CDONE to "0" and outputs the flag.

Where the shared memory 141 is to be used for storing correlation values, the delay profile determination part 132 outputs a control signal "flagd" to let the shared memory 141 store the correlation values corr(t) obtained by the PN correlation calculation part 131. In this case, the correlation values corr(t) acquired by the PN correlation calculation part 131 are fed to the shared memory 141 by way of the selector 143. Also, the control signal "flagd" is supplied to the shared memory 141 via the selector 142.

When the correlation values corr(t) for one frame are stored in the shared memory 141, the delay profile determination part 132 estimates the channel as discussed above on the basis of the correlation values corr(t) (signal rdata) for one frame retrieved from the shared memory 141. The delay profile determination part 132 determines the delay amount "delay" in accordance with the estimated channel, and outputs the signal representing the delay amount "delay" to the variable delay buffer control part 133.

Meanwhile, when channel estimation is completed and the shared memory 141 is set to be used for delaying data, the delay profile determination part 132 sets the correlation calculation complete flag CDONE to "1" and outputs the flag.

When supplied with the signal representing the delay amount "delay" from the delay profile determination part 132, the variable delay buffer control part 133 outputs a control signal "flagb" to let the shared memory 141 serve as a memory for delaying data. The control signal "flagb" includes information representing the delay amount "delay" and is sent to the shared memory 141 via the selector 142.

The FBE 74 is made up of flip-flops 151-1 through 151-6, multipliers 152-1 through 152-6, and an adder 153. The signal OD'(t) coming from the hard decision block 73 and representing the result of a hard decision is input to the flip-flop 151-1.

The flip-flops 151-1 through 151-6 hold the data input thereto and output the retained data in a suitably timed manner.

The multipliers 152-1 through 152-6 multiply the outputs of the flip-flops 151-1 through 151-6 respectively by the coefficient C1(n) established by the LMS operation block 77, and output the results of the multiplications to the adder 153.

The adder 153 adds up the results of the multiplications fed from the multipliers 152-1 through 152-6, and outputs the sum to the addition block 72 as the output signal OD1(t).

Where the correlation calculation complete flag CDONE set to "0" is supplied from the delay profile determination part 132, the selector 142 selects the control signal "flagd" fed from the delay profile determination part 132 and outputs the selected signal to the shared memory 141. Where the correlation calculation complete flag CDONE set to "1" is sent from the delay profile determination part 132, the selector 142 selects the control signal "flagb" supplied from the variable delay buffer control part 133 and outputs the selected signal to the shared memory 141.

When supplied with the correlation calculation complete flag CDONE set to "0" from the delay profile determination part 132, the selector 143 selects the correlation values corr(t) sent from the PN correlation calculation part 131 and outputs the selected values to the shared memory 141. When fed with the correlation calculation complete flag CDONE set to "1" from the delay profile determination part 132, the selector 143 selects the output of the flip-flop 151-4 and outputs what is selected to the shared memory 141.

The shared memory 141 has a capacity large enough to store the correlation values corr(t) for one frame and to delay sufficiently the output of the flip-flop 151-4 supplied by way of the selector 143. When the control signal "flagd" is fed from the selector 142, the shared memory 141 stores the correlation values corr(t) coming from the selector 143.

Also, when supplied with the control signal "flagb" from the selector 142, the shared memory 141 establishes the delay amount in keeping with the control signal "flagb." The shared memory 141 delays by the established delay amount the output of the flip-flop 151-4 fed via the selector 143, and outputs the delayed result to the flip-flop 151-5.

[Example of Equalization Process]

Figure 15:
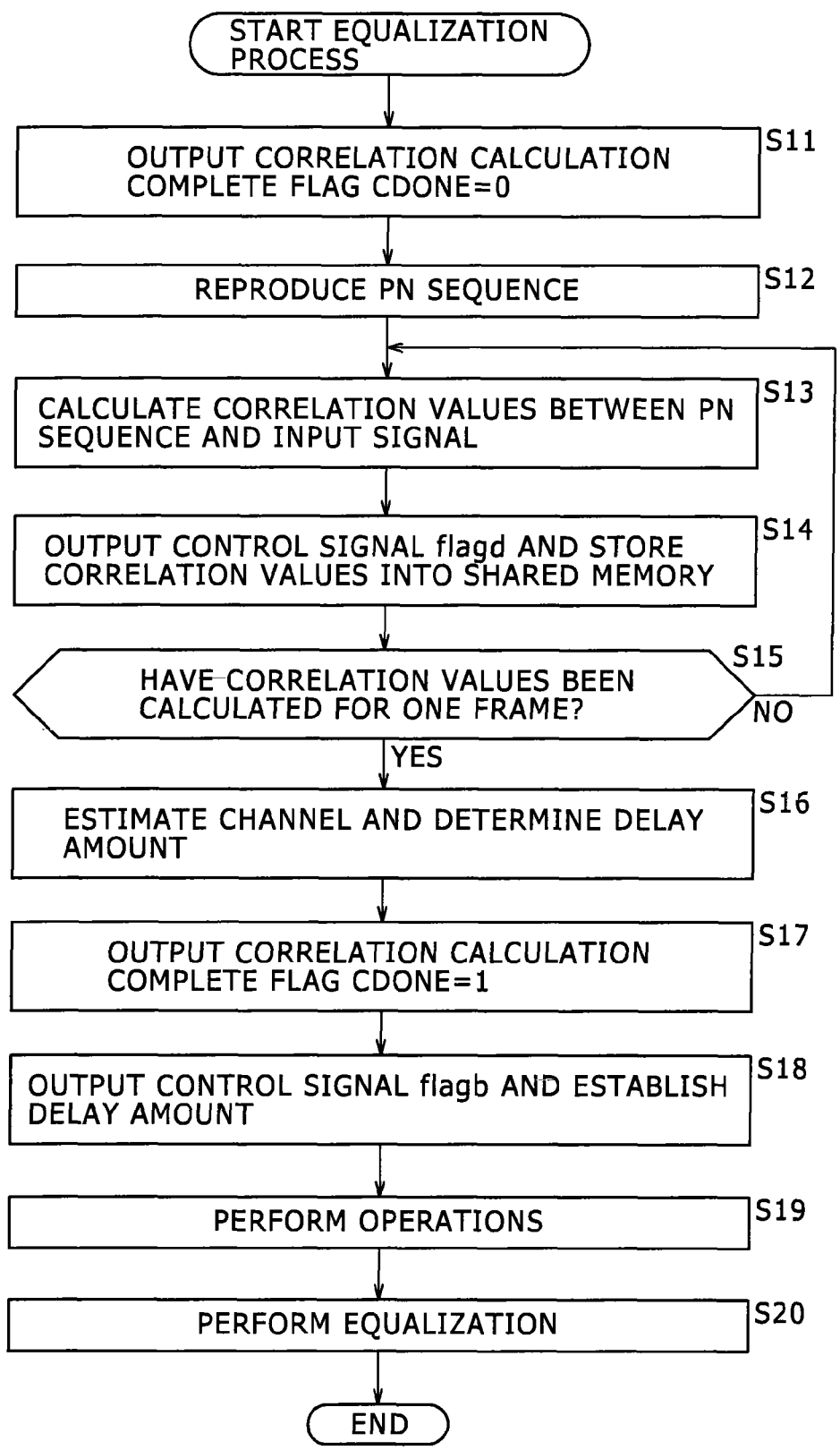
FIG. 15 is a flowchart explanatory of the flow of an equalization process performed by the signal processing block.

Explained below in reference to the flowchart of FIG. 15 is the flow of the equalization process performed by the signal processing block 81 structured as illustrated in FIG. 14.

In step S11, the delay profile determination part 132 sets the correlation calculation complete flag CDONE to "0" and outputs the flag. This causes the shared memory 141 to be supplied with both the control signal "flagd" selected by the selector 142 and the correlation values corr(t) selected by the selector 143. The shared memory 141 thus functions as a correlation value storage memory.

In step S12, the PN correlation calculation part 131 reproduces a PN sequence.

In step S13, the PN correlation calculation part 131 calculates the correlation values corr(t) between the reproduced PN sequence and the input signal ID(t). The correlation values corr(t) obtained by the PN correlation calculation part 131 are sent to the shared memory 141.

In step S14, the delay profile determination part 132 outputs the control signal "flagd" causing the shared memory 141 to store the correlation values corr(t) obtained by the PN correlation calculation part 131.

In step S15, the delay profile determination part 132 determines whether the correlation values corr(t) for one frame have been calculated. If it is determined in step S15 that the correlation values corr(t) have yet to be calculated for one frame, step S13 is reached again and calculation of the correlation values corr(t) is repeated.

If it is determined in step S15 that the correlation values corr(t) for one frame have been calculated, then step S16 is reached. In step S16, the delay profile determination part 132 reads the correlation values corr(t) for one frame stored in the shared memory 141. Based on the retrieved correlation values corr(t) for one frame, the delay profile determination part 132 estimates the channel and determines the delay amount "delay" in keeping with the estimated channel.

In step S17, the delay profile determination part 132 sets the correlation calculation complete flag CDONE to "1" and outputs the flag. This causes the shared memory 141 to be supplied with both the control signal "flagb" selected by the selector 142 and the output of the flip-flop 151-4 selected by the selector 143. The shared memory 141 thus serves to delay data.

In step S18, the variable delay buffer control part 133 outputs the control signal "flagb" to the shared memory 141 by way of the selector 142, thereby establishing the delay amount.

In step S19, the FBE 74 delays the signal OD'(t) at each point in time using the shared memory 141 as a variable delay buffer, and performs operations using the coefficient C1(n) established by the LMS operation block 77. The FBE 74 outputs the signal OD1(t) representing the result of the convolution operation and sends the signal to the addition block 72.

In step S20, the addition block 72 adds up the output signal OD0(t) of the FFE 71 and the output signal OD1(t) of the FBE 74 to generate the equalized signal OD(t) that is output. Thereafter, the equalization process is terminated.

As described above, the variable delay buffer for the FBE 74 and the correlation value storage memory for the channel estimation section 78 may be implemented using a single shared memory. This makes it possible to make the scale of circuitry of the single carrier equalization portion 66 appreciably smaller than if individual memories were prepared.

Alternatively, as explained above in reference to FIG. 13, there may be provided a plurality of memories on the data line of the FBE 74, one of the memories being used by the FBE 74 for delaying data and another by the channel estimation section 78 for storing correlation values.

[Another Example of Signal Processing Portion]

The reception apparatus 51 complying with the DTMB standard includes the multi-carrier equalization portion 67 in addition to the single carrier equalization portion 66. Upon receipt of data sent by multi-carrier transmission, the multi-carrier equalization portion 67 performs various operations. It is possible to have a single memory shared by three portions: by the FBE 74 of the single carrier equalization portion 66 for delaying data; by the channel estimation section 78 for storing correlation values; and by the multi-carrier equalization portion 67 for performing operations.

Figure 16:
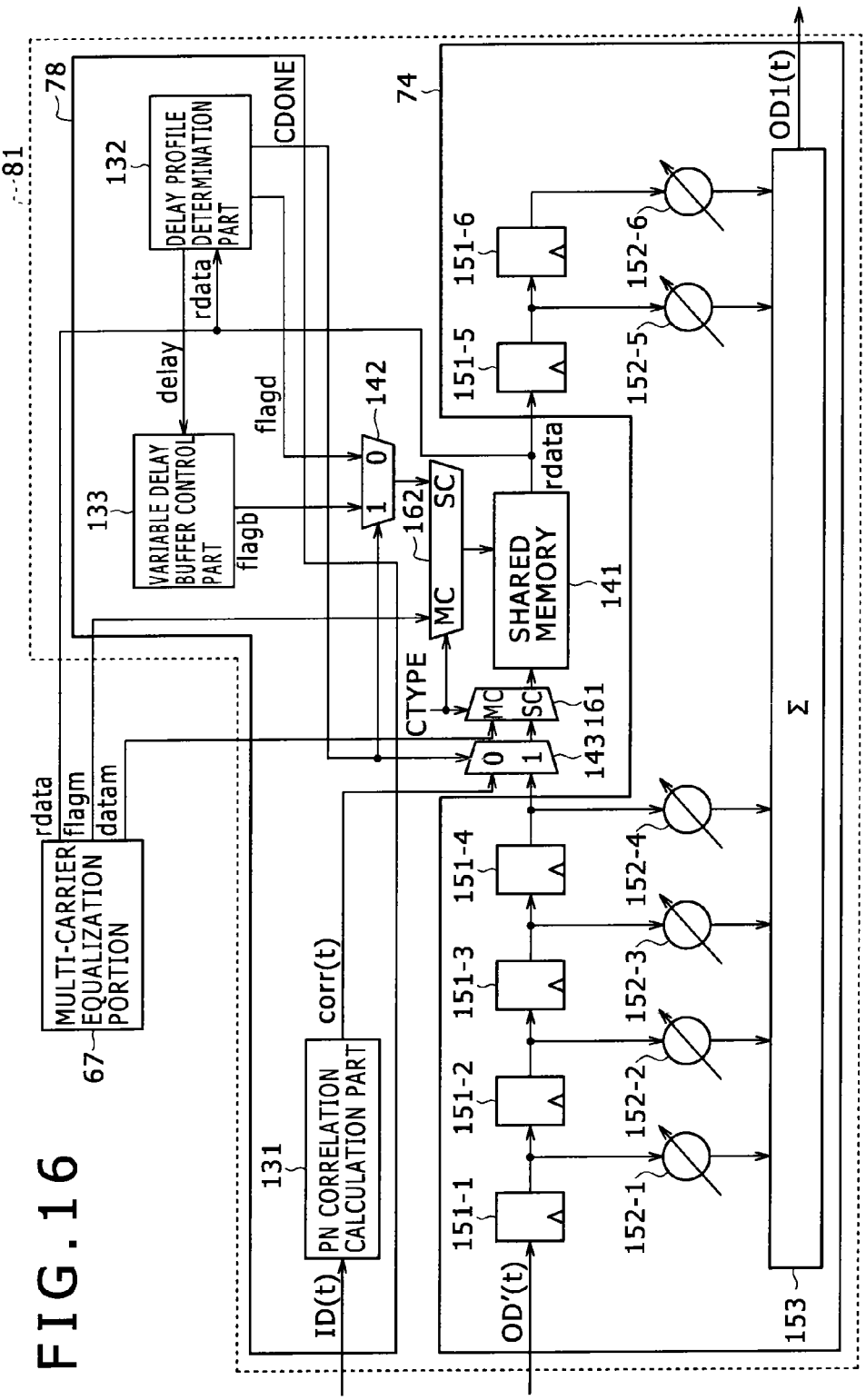
FIG. 16 is a block diagram showing another typical structure of the signal processing block.

FIG. 16 is a block diagram showing another typical structure of the signal processing block 81.

Of the components making up the signal processing block 81 shown in FIG. 16, those corresponding to like components in FIG. 14 are designated by like reference characters, and their explanations may be omitted hereunder where appropriate.

The signal processing block 81 shown in FIG. 16 is structured differently from its counterpart in FIG. 14 in that selectors 161 and 162 are additionally furnished. For example, a reception mode signal CTYPE output from the controller 68 is input to the selectors 161 and 162 whereby the uses of the shared memory 141 are switched. The reception mode signal CTYPE designates one of two modes: MC mode in which the reception apparatus 51 receives data transmitted by multi-carrier transmission, and SC mode in which the reception apparatus 51 receives data sent by single carrier transmission.

If the reception mode signal CTYPE designates MC mode, the shared memory 141 is used to perform operations for receiving the data transmitted by multi-carrier transmission. If the reception mode signal CTYPE designates SC mode and if the correlation calculation complete flag CDONE is set to "0," then the shared memory 141 is used for storing correlation values. If the reception mode signal CTYPE designates SC mode and if the correlation calculation complete flag CDONE is set to "1," then the shared memory 141 is used for delaying data.

When the reception mode signal CTYPE designates SC mode, the components of the FBE 74 and those of the channel estimation section 78 operate.

The PN correlation calculation part 131 of the channel estimation section 78 reproduces a PN sequence and calculates the correlation values between the reproduced PN sequence and the input signal ID(t). The correlation values corr(t) obtained by the PN correlation calculation part 131 are supplied to the selector 143.

Where the shared memory 141 is to be used for storing correlation values, the delay profile determination part 132 sets the correlation calculation complete flag CDONE to "0" and outputs the flag.

With the shared memory 141 used for storing correlation values, the delay profile determination part 132 outputs the control signal "flagd" so as to store into the shared memory 141 the correlation values corr(t) obtained by the PN correlation calculation part 131. If the reception mode signal CTYPE designates SC mode and if the correlation calculation complete flag CDONE is set to "0," then the correlation values corr(t) obtained by the PN correlation calculation part 131 are fed to the shared memory 141 by way of the selectors 143 and 161. Also, the control signal "flagd" is supplied to the shared memory 141 via the selector 142 and 162.

When the correlation values for one frame have been stored in the shared memory 141, the delay profile determination part 132 estimates the channel based on the correlation values corr(t) for one frame retrieved from the shared memory 141. The delay profile determination part 132 determines the delay amount "delay" in accordance with the estimated channel and outputs the signal representing the delay amount "delay" to the variable delay buffer control part 133.

Meanwhile, with the channel estimation completed and with the shared memory 141 set to be used for delaying data, the delay profile determination part 132 sets the correlation calculation complete flag CDONE to "1" and outputs the flag.

When the signal representing the delay amount "delay" is fed from the delay profile determination part 132, the variable delay buffer control part 133 outputs the control signal "flagb" so as to let the shared memory 141 serve as a memory for delaying data. The control signal "flagb" includes information representing the delay amount "delay" and is sent to the shared memory 141 by way of the selectors 142 and 162.

The flip-flops 151-1 through 151-6 of the FBE 74 hold the data input thereto and output the retained data in a suitably timed manner.

The multipliers 152-1 through 152-6 multiply the outputs of the flip-flops 151-1 through 151-6 respectively by the coefficient C1(n) established by the LMS operation block 77, and output the results of the multiplications to the adder 153.

The adder 153 adds up the results of the multiplications fed from the multipliers 152-1 through 152-6, and outputs the sum to the addition block 72 as the output signal OD1(t).

Where the correlation calculation complete flag CDONE set to "0" is supplied from the delay profile determination part 132, the selector 142 selects the control signal "flagd" fed from the delay profile determination part 132 and outputs the selected signal to the selector 162. Where the correlation calculation complete flag CDONE set to "1" is sent from the delay profile determination part 132, the selector 142 selects the control signal "flagb" supplied from the variable delay buffer control part 133 and outputs the selected signal to the selector 162.

When supplied with the correlation calculation complete flag CDONE set to "0" from the delay profile determination part 132, the selector 143 selects the correlation values corr(t) sent from the PN correlation calculation part 131 and outputs the selected values to the selector 161. When fed with the correlation calculation complete flag CDONE set to "1" from the delay profile determination part 132, the selector 143 selects the output of the flip-flop 151-4 and outputs what is selected to the selector 161.

When the reception mode signal CTYPE designates SC mode, the selector 161 selects either the correlation values corr(t) or the output of the flip-flop 151-4 fed from the selector 143 and outputs what is selected to the shared memory 141. When the reception mode signal CTYPE designates MC mode, the selector 161 selects data "datam" supplied from the multi-carrier equalization portion 67 and outputs the selected data to the shared memory 141.

When the reception mode signal CTYPE designates SC mode, the selector 162 selects the control signal "flagb" or "flagd" fed from the selector 142 and outputs the selected signal to the shared memory 141. When the reception mode signal CTYPE designates MC mode, the selector 161 selects a control signal "flagm" coming from the multi-carrier equalization portion 67 and outputs the selected signal to the shared memory 141.

The shared memory 141 has a capacity large enough to store the correlation values corr(t) for one frame and to delay sufficiently the output of the flip-flop 151-4 supplied by way of the selectors 143 and 161. When the control signal "flagd" is fed from the selector 162, the shared memory 141 stores the correlation values corr(t) coming from the selector 161.

Also, when supplied with the control signal "flagb" from the selector 162, the shared memory 141 establishes the delay amount in such a manner that the output of the flip-flop 151-4 fed via the selector 161 is delayed by a predetermined time period. The shared memory 141 delays by the established delay amount the output of the flip-flop 151-4 supplied from the selector 161, and outputs the delayed result to the flip-flop 151-5.

When the control signal "flagm" is fed from the selector 162, the shared memory 141 stores the data "datam" supplied from the selector 161.

When the reception mode signal CTYPE designates MC mode, the multi-carrier equalization portion 67 performs various operations using the shared memory 141. The multi-carrier equalization portion 67 outputs the control signal "flagm" so as to let the shared memory 141 store the data "datam" targeted to be written. Also, the multi-carrier equalization portion 67 may read the data "datam" from the shared memory 141 as needed.

[Structure of Multi-carrier Equalization Portion 67]

Figure 17:
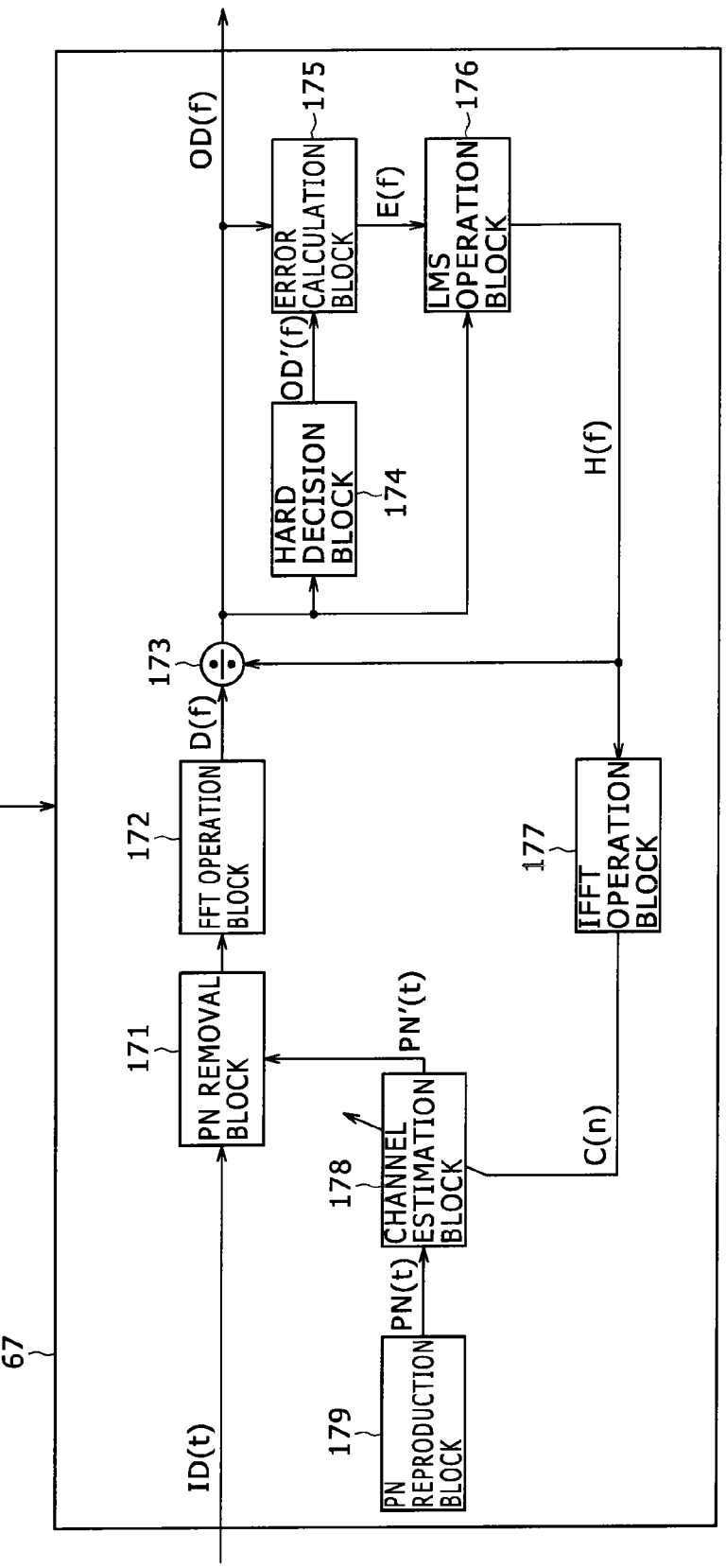
FIG. 17 is a block diagram showing a typical structure of a multi-carrier equalization portion.

FIG. 17 is a block diagram showing a typical structure of the multi-carrier equalization portion 67. The input signal ID(t) supplied via the switching portion 65 shown in FIG. 5 is input to a PN removal block 171.

The PN removal block 171 removes the PN signal by subtracting from the input signal ID(t) an estimate value PN'(t) of the PN signal supplied from a channel estimation block 178. The PN removal block 171 outputs the resulting data signal (ID(t)−PN'(t)) to an FFT operation block 172.

The FFT operation block 172 performs an FFT on the data signal fed from the PN removal block 171 and outputs the resulting data signal D(f) to a division block 173. Since the data signal sent by multi-carrier transmission has undergone an IFFT operation performed by the transmission apparatus, the multi-carrier equalization portion 67 carries out the FFT operation on the data signal. The data signal D(f) is a frequency domain signal.

The division block 173 divides the data signal D(f) fed from the FFT operation block 172 by a channel estimate value H(f) supplied from an LMS operation block 176, thereby generating an equalized signal OD(f) and outputting the generated signal. The equalized signal OD(f) from the division block 173 is output to the outside and forwarded to a hard decision block 174 and the LMS operation block 176.

The hard decision block 174 performs a hard decision on the equalized signal OD(f) and outputs a signal OD'(f) representing the result of the hard decision to an error calculation block 175.

The error calculation block 175 subtracts from the equalized signal OD(f) the signal OD'(f) supplied from the hard decision block 174, and outputs the resulting error signal E(f) (E(f)=OD(f)−OD'(f)) to the LMS operation block 176.

The LMS operation block 176 performs an LMS operation on the equalized signal OD(f) supplied from the division block 173 and on the error signal E(f) fed from the error calculation block 175, so as to obtain the channel estimate value H(f) in the frequency domain. The channel estimate value H(f) acquired by the LMS operation block 176 is sent to the division block 173 for equalizing the data signal D(f) as well as to an IFFT operation block 177.

The IFFT operation block 177 performs an IFFT operation on the channel estimate value H(f) fed from the LMS operation block 176, and outputs a channel estimate value C(n) in the time domain to the channel estimation block 178.

The channel estimation block 178 is composed of a variable coefficient filter that performs a convolution operation on the PN sequence PN(t) reproduced by a PN reproduction block 179 and on a coefficient C(n) provided by the IFFT operation block 177 as the channel estimate value C(n). The channel estimation block 178 outputs to the PN removal block 171 an estimate value PN'(t) of the PN signal obtained through the convolution operation. The estimate value PN'(t) of the PN signal is defined by the following expression (3):

$$PN'(t) = \sum_{i=0}^{N\_CHE-1} PN(t-i) \times C(i) \quad (3)$$

where, PN(t) represents the PN signal reproduced by the PN reproduction block 179 and N_CHE denotes the tap count of the filter constituting the channel estimation block 178.

The PN reproduction block 179 reproduces the PN sequence PN(t) and outputs the reproduced PN sequence to the channel estimation block 178.

As explained above, the multi-carrier equalization portion 67 performs diverse processes including the FFT operation by the FFT operation block 172, hard decision operation by the hard decision operation block 174, error calculation by the error calculation block 175, and LMS operation by the LMS operation block 176. At least some of these processes are carried out using the shared memory 141 of the single carrier equalization portion 66.

The shared memory 141 may also be used to perform other processes that are to be carried out upon receipt of data sent by multi-carrier transmission, such as de-interleaving of the data represented by the equalized signal OD(f) output from the multi-carrier equalization portion 67.

[Examples of Applying Reception Apparatus to Reception System]

Figure 18:
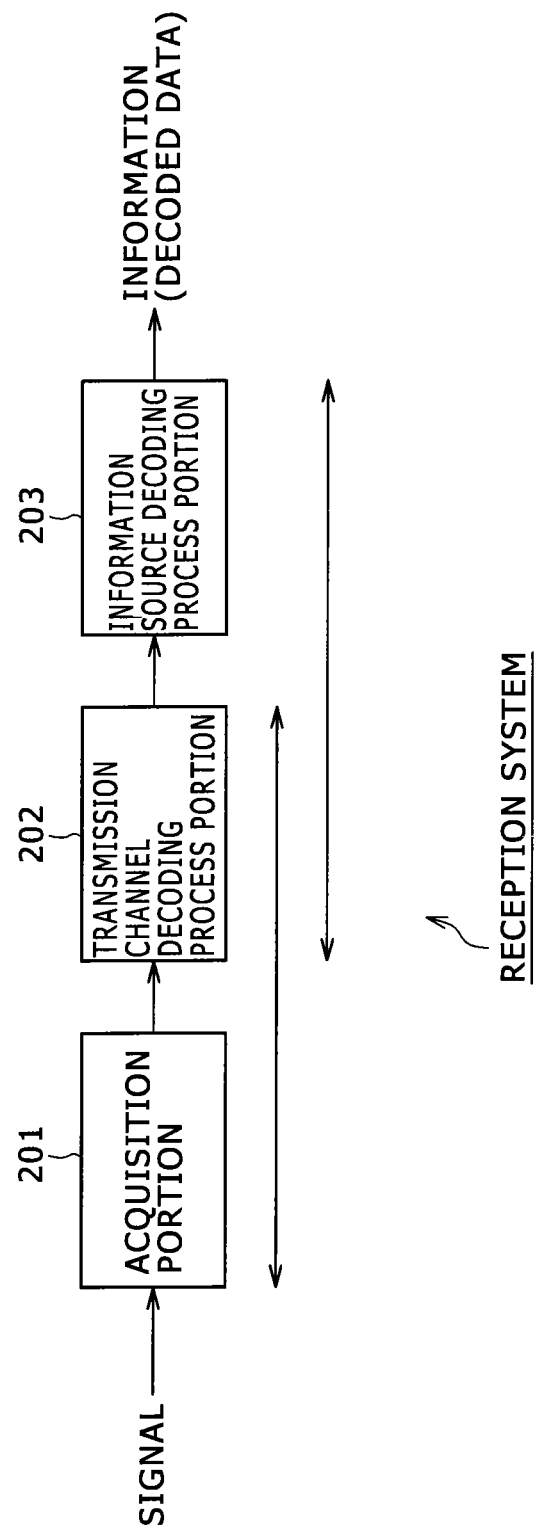
FIG. 18 is a block diagram showing a typical configuration of a first embodiment of a reception system.

FIG. 18 is a block diagram showing a typical configuration of a first embodiment of a reception system to which the reception apparatus 51 of FIG. 5 is applied.

The reception system in FIG. 18 is made up of an acquisition portion 201, a transmission channel decoding process portion 202, and an information source decoding process portion 203.

The acquisition portion 201 acquires signals via transmission channels such as terrestrial digital broadcasts, satellite digital broadcasts, CATV networks, the Internet, and the other network not shown, and feeds the acquired signal to the transmission channel decoding process portion 202. For example, the reception apparatus 51 shown in FIG. 5 may be included in the acquisition portion 201.

The transmission channel decoding process portion 202 performs a transmission channel decoding process including error correction on the signal acquired by the acquisition portion 201 over the transmission channels, and supplies the processed signal to the information source decoding process portion 203.

The information source decoding process portion 203 performs an information source decoding process on the signal having undergone the transmission channel decoding process, the information source decoding process including the process of expanding compressed information back to the original information so as to acquire the transmitted data.

That is, the signal acquired by the acquisition portion 201 over the transmission channels may have been subjected to a compression coding process that compresses information in order to reduce the amount of data such as images and sounds. In such a case, the information source decoding process portion 203 performs on the signal having undergone the transmission channel decoding process the information source decoding process such as the process of expanding compressed information back to the original information.

If the signal acquired by the acquisition portion 201 over the transmission channels has not been subjected to compression coding, the information source decoding process portion 203 does not perform the process of expanding compressed information back to the original information. MPEG (Motion Picture Experts Group) decoding is an example of the expansion process. Also, the information source decoding process may include descrambling in addition to the expansion process.

The reception system of FIG. 18 may be applied typically to a TV tuner for receiving digital TV broadcasts. The acquisition portion 201, transmission channel decoding process portion 202, and information source decoding portion 203 may each be constituted as an independent device (hardware (e.g., IC (integrated circuit)) or a software module).

Alternatively, the acquisition portion 201, transmission channel decoding process portion 202, and information source decoding process portion 203 may be implemented altogether as an independent device. As another alternative, the acquisition portion 201 and transmission channel decoding process portion 202 may be implemented in combination as an independent device. As a further alternative, the transmission channel decoding process portion 202 and information source decoding process portion 203 may be implemented in combination as an independent device.

Figure 19:
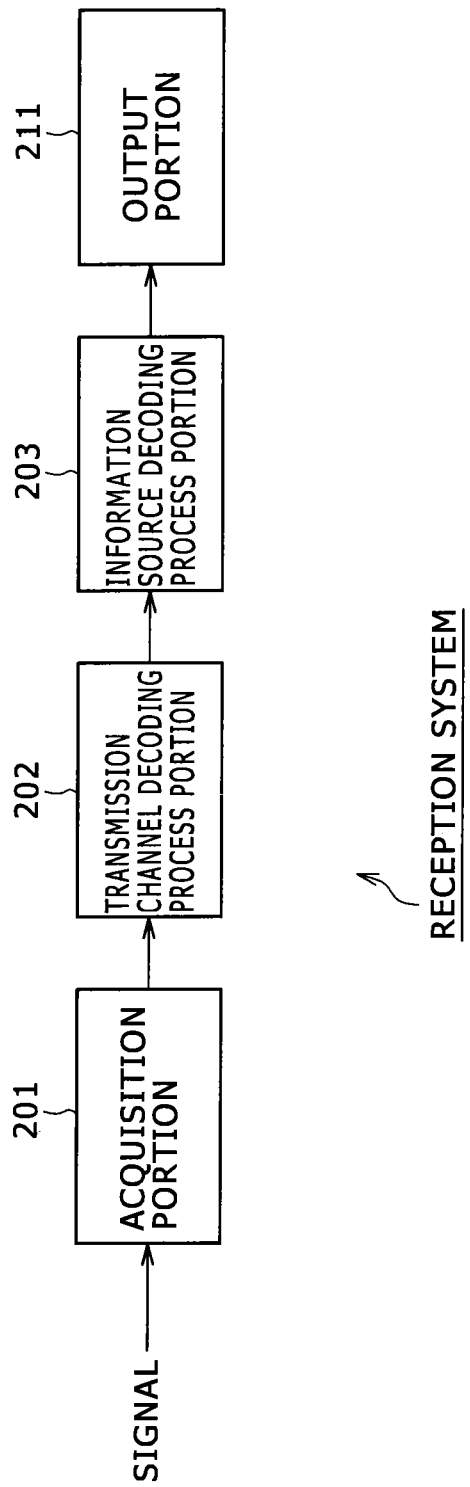
FIG. 19 is a block diagram showing a typical configuration of a second embodiment of the reception system.

FIG. 19 is a block diagram showing a typical configuration of a second embodiment of the reception system to which the reception apparatus 51 of FIG. 5 is applied.

Of the components shown in FIG. 19, those corresponding to like components in FIG. 18 are designated by like reference characters, and their explanations may be omitted hereunder where appropriate.

The reception system of FIG. 19 is configured the same as the reception system of FIG. 18 in that the acquisition portion 201, transmission channel decoding process portion 202, and information source decoding process portion 203 are provided. On the other hand, the reception system of FIG. 19 is configured differently from the system of FIG. 18 in that an output portion 211 is provided anew.

For example, the output portion 211 may be composed of a display unit for displaying images and of speakers for outputting sounds, the output images and sounds being representative of the signal coming from the information source decoding process portion 203. That is, the output portion 211 outputs images and/or sounds.

The reception system of FIG. 19 may be applied to a TV set for receiving digital TV broadcasts or to a radio receiver for receiving radio broadcasts, for example.

If the signal obtained by the acquisition portion 201 has not undergone compression coding, then the signal output from the transmission channel decoding process portion 202 is sent directly to the output portion 211.

Figure 20:
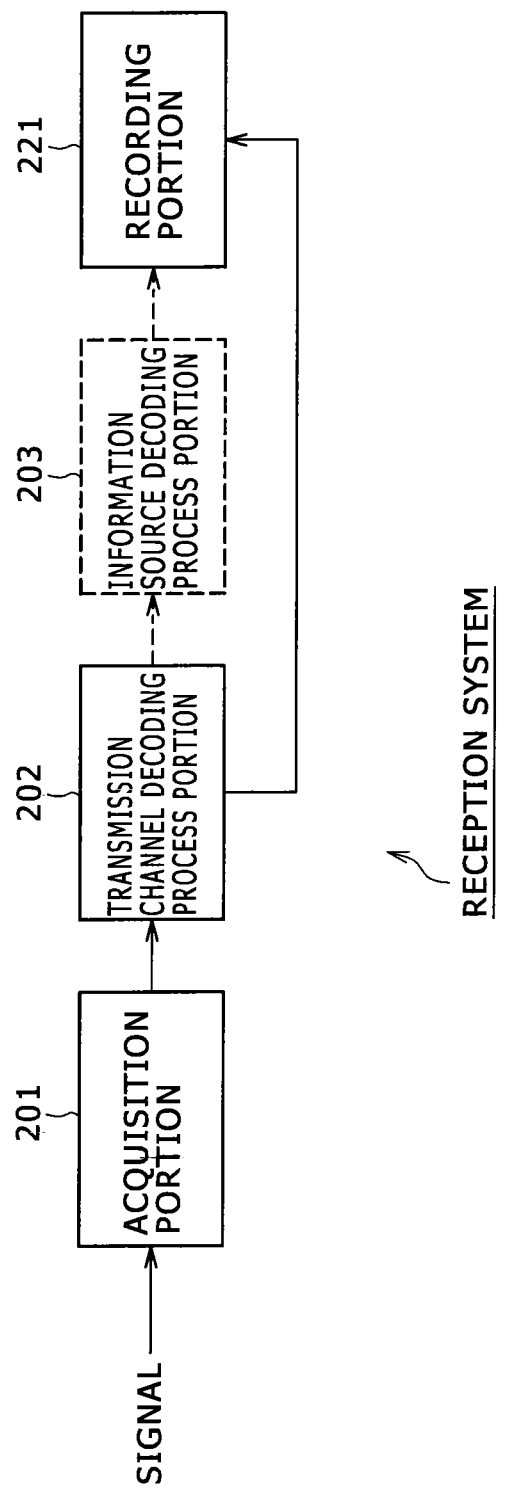
FIG. 20 is a block diagram showing a typical configuration of a third embodiment of the reception system.

FIG. 20 is a block diagram showing a typical configuration of a third embodiment of the reception system to which the reception apparatus 51 of FIG. 5 is applied.

Of the components shown in FIG. 20, those corresponding to like components in FIG. 18 are designated by like reference characters, and their explanations may be omitted hereunder where appropriate.

The reception system of FIG. 20 is configured the same as the reception system of FIG. 18 in that the acquisition portion 201 and transmission channel decoding process portion 202 are provided. On the other hand, the reception system of FIG. 20 is configured differently from the system of FIG. 18 in that the information source decoding process portion 203 is not provided and a recording portion 221 is furnished anew.

The recording portion 221 records (i.e., stores) the signal output from the transmission channel decoding process portion 202 (e.g., TS packets in MPEG format) to recording (i.e., storage) media such as optical disks, hard disks (magnetic disks) and flash memories.

The reception system of FIG. 20 outlined above may be applied to a recorder for recording TV broadcasts, for example.

As another example, the information source decoding process portion 203 may be provided in the reception system. In this setup, the recording portion 221 may be arranged to record the signal having undergone the information source decoding process performed by the information source decoding process portion 203, the signal being representative of the images and sounds obtained through the decoding process.

[Typical Structure of Computer]

The series of the processes described above may be executed either by hardware or by software. Where the software-based processing is to be carried out, the programs constituting the software may be either incorporated beforehand in the dedicated hardware of the computer to be used or installed upon use from a suitable program recording medium into a general-purpose personal computer or like equipment.

Figure 21:
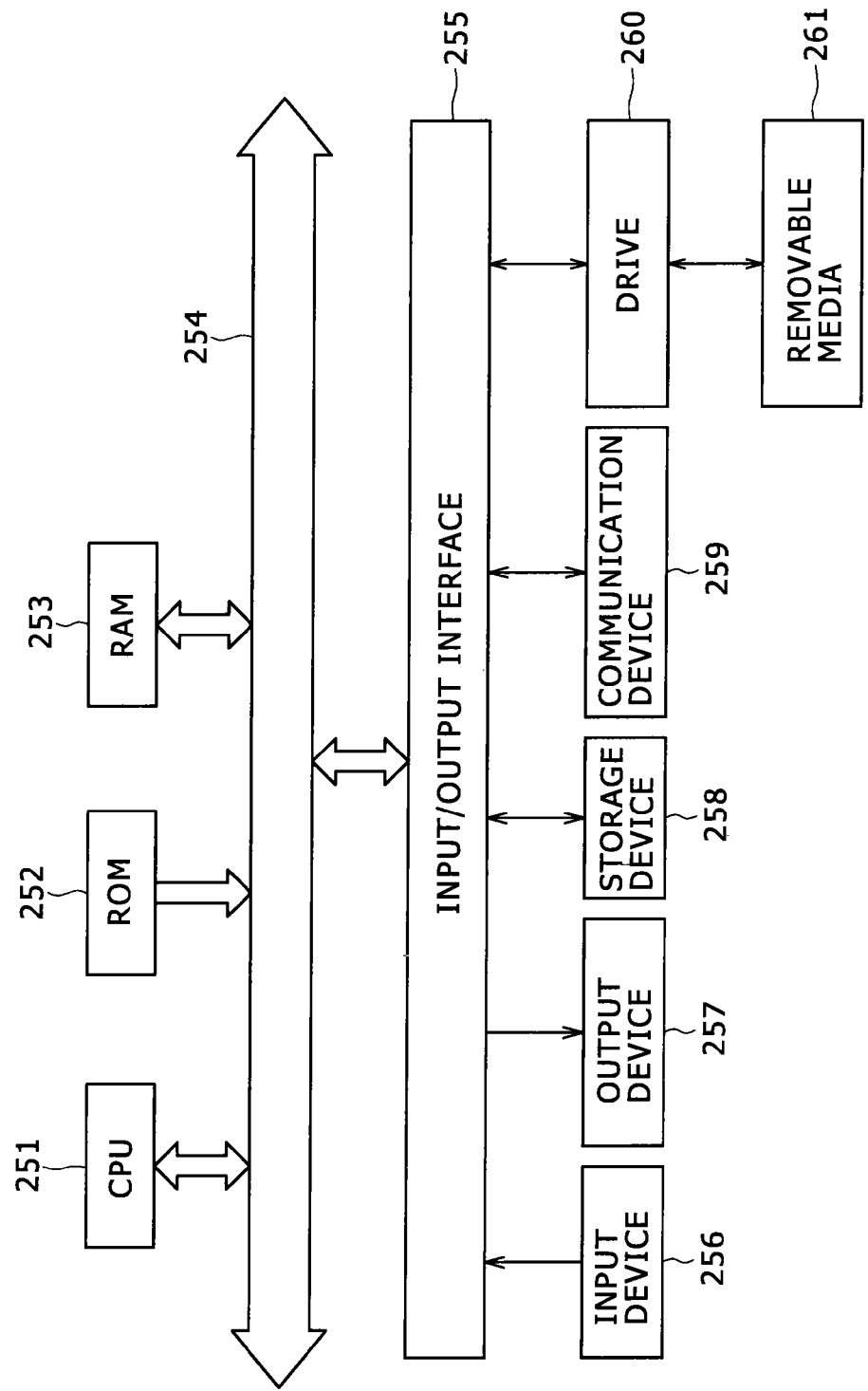
FIG. 21 is a block diagram showing a typical structure of a computer.

FIG. 21 is a block diagram showing a typical structure of a computer for executing the series of the above-described processes using suitable programs.

A CPU (central processing unit) 251, a ROM (read only memory) 252, and a RAM (random access memory) 253 are interconnected via a bus 254.

An input/output interface 255 is further connected to the bus 254. The input/output interface 255 is connected with an input device 256 typically composed of a keyboard and a mouse and with an output device 257 usually made up of a display unit and speakers. The input/output interface 255 is also connected with a storage device 258 generally constituted by a hard disk and/or a nonvolatile memory, with a communication device 259 typically formed by a network interface, and with a drive 260 for driving removable media 261.

In the computer structured as outlined above, the CPU 251 may perform the series of the above-described processes by loading relevant programs from the storage device 258 into the RAM 253 for execution by way of the input/output interface 255 and bus 254, for example.

The programs to be executed by the CPU 251 may be installed into the storage device 258 after they have been retrieved from the removable media 261 or offered through wired or wireless transmission media such as local area networks, the Internet or digital broadcasts, for example.

Also, the programs for execution by the computer may be processed in the depicted sequence of this specification (i.e., on a time series basis), in parallel, or in otherwise appropriately timed fashion such as when they are invoked.

It should be understood by those skilled in the art that various modifications, combinations, sub-combinations and alterations may occur depending on design requirements and other factors in so far as they are within the scope of the appended claims or the equivalents thereof.

The present disclosure contains subject matter related to that disclosed in Japanese Priority Patent Application JP 2010-237578 filed in the Japan Patent Office on Oct. 22, 2010, the entire content of which is hereby incorporated by reference.

What is claimed is:

1. A reception apparatus comprising:
   a calculation section operable to calculate correlation values between a data sequence included in a known signal and a received signal at a given point in time;
   a storage section operable to have at least an area sufficient for storing said correlation values calculated for one frame using said received signal which is one frame long and to which said known signal is added;
   an estimation section operable to perform channel estimation based on said correlation values stored in said storage section for said one frame; and
   an equalization section operable to equalize said received signal by multiplying said received signal at each point in time by a coefficient assigned to said received signal at that point in time and by adding up the results of said multiplications, wherein said estimation section establishes a delay amount of a variable delay buffer in accordance with the result of said channel estimation so as to allow said coefficient be assigned to said received signal that is determined to be echo, and wherein said equalization section causes said variable delay buffer to delay said received signal at each point in time so as to perform said equalization.

2. The reception apparatus according to claim 1, wherein said estimation section estimates a plurality of positions of a dominant wave and of said echo based on a magnitude of absolute values of said correlation values and on a peak-to-peak distance of said correlation values.

3. The reception apparatus according to claim 1, wherein said storage section and said variable delay buffer are implemented by the same storage section.

4. The reception apparatus according to claim 3, wherein said received signal is a data signal transmitted by single carrier transmission under the digital terrestrial multimedia broadcast standard, said reception apparatus further including a reception section configured such that upon receipt of data transmitted by multi-carrier transmission under the digital terrestrial multimedia broadcast standard, said reception section performs operations using the same storage section implementing both said storage section and said variable delay buffer in order to receive the data transmitted by said multi-carrier transmission.

5. A reception method comprising:
- calculating correlation values between a data sequence included in a known signal and a received signal at a given point in time;
- storing said correlation values calculated for one frame using said received signal which is one frame long and to which said known signal is added, into a storage section having at least an area sufficient for storing said correlation values;
- equalizing said received signal by multiplying said received signal at each point in time by a coefficient assigned to said received signal at that point in time and by adding up results of said multiplications; and
- estimating a plurality of positions of a dominant wave and of echo based on a magnitude of absolute values of said correlation values and on a peak-to-peak distance of said correlation values.

6. A non-transitory computer-readable storage medium having stored thereon, a computer program having at least one code section for communication, the at least one code section being executable by a computer for causing the computer to perform steps comprising:
- calculating correlation values between a data sequence included in a known signal and a received signal at a given point in time;
- storing said correlation values calculated for one frame using said received signal which is one frame long and to which said known signal is added, into a storage section having at least an area sufficient for storing said correlation values;
- equalizing said received signal by multiplying said received signal at each point in time by a coefficient assigned to said received signal at that point in time and by adding up results of said multiplications; and
- estimating a plurality of positions of a dominant wave and of echo based on a magnitude of absolute values of said correlation values and on a peak-to-peak distance of said correlation values.

7. The reception apparatus according to claim 1, wherein said calculation section is further operable to reproduce said data sequence.

8. The reception method according to claim 5, further comprising performing channel estimation based on said correlation values stored in said storage section for said one frame.

9. The reception method according to claim 8, further comprising establishing a delay amount of a variable delay buffer in accordance with the result of said channel estimation so as to allow said coefficient be assigned to said received signal that is determined to be echo.

10. The reception method according to claim 9, further comprising causing said variable delay buffer to delay said received signal at each point in time so as to perform said equalization.

11. The reception method according to claim 10, wherein said storage section and said variable delay buffer are implemented by the same storage section.

12. The reception method according to claim 5, wherein said received signal is a data signal transmitted by single carrier transmission under the digital terrestrial multimedia broadcast standard.

13. The reception method according to claim 5, further comprising performing operations using a single storage section implementing both said storage section and a variable delay buffer in order to receive the data transmitted by multi-carrier transmission.

14. A reception method comprising:
- calculating correlation values between a data sequence included in a known signal and a received signal at a given point in time;
- storing said correlation values calculated for one frame using said received signal which is one frame long and to which said known signal is added, into a storage section having at least an area sufficient for storing said correlation values;
- equalizing said received signal by multiplying said received signal at each point in time by a coefficient assigned to said received signal at that point in time and by adding up results of said multiplications; and
- performing operations using a single storage section implementing both said storage section and a variable delay buffer in order to receive said data transmitted by multi-carrier transmission.

* * * * *